(12) United States Patent
Chitrakar et al.

(10) Patent No.: US 11,706,714 B2
(45) Date of Patent: Jul. 18, 2023

(54) COMMUNICATION APPARATUS AND COMMUNICATION METHOD FOR DUTY CYCLED LOW POWER MULTI-USER TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 213 days.

(21) Appl. No.: 17/256,263

(22) PCT Filed: Aug. 29, 2019

(86) PCT No.: PCT/JP2019/033994
§ 371 (c)(1),
(2) Date: Dec. 28, 2020

(87) PCT Pub. No.: WO2020/050141
PCT Pub. Date: Mar. 12, 2020

(65) Prior Publication Data
US 2021/0227471 A1 Jul. 22, 2021

(30) Foreign Application Priority Data

Sep. 4, 2018 (JP) .................................. 2018-165250

(51) Int. Cl.
*H04W 52/02* (2009.01)
*H04W 84/12* (2009.01)

(52) U.S. Cl.
CPC ... *H04W 52/0235* (2013.01); *H04W 52/0248* (2013.01); *H04W 84/12* (2013.01)

(58) Field of Classification Search
CPC ......... H04W 52/0248; H04W 52/0235; H04W 84/12
See application file for complete search history.

(56) References Cited

U.S. PATENT DOCUMENTS

2019/0357143 A1* 11/2019 Wang ................ H04W 52/0229

OTHER PUBLICATIONS

Extended European Search Report, dated Nov. 2, 2021, for European Application No. 19858255.3-1212. (11 pages).

(Continued)

*Primary Examiner* — James P Duffy
(74) *Attorney, Agent, or Firm* — Seed IP Law Group LLP

(57) ABSTRACT

The present disclosure provides a communication apparatus that comprises a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and a processor which, in operation, operates the duty cycle, wherein, during a determined time from the TWBTT, any WUR frame is not transmitted in the first channel from the AP.

20 Claims, 23 Drawing Sheets

(56) References Cited

OTHER PUBLICATIONS

LAN/MAN Standards Committee, "IEEE P802.11ba/D0.4, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 9: Wake-Up Radio Operation," IEEE Computer Society, Aug. 2018, (90 pages).
Huang, "Specification Framework for TGba," IEEE 802.11-17/0575r8, Dec. 21, 2017, 13 pages.
International Search Report, dated Oct. 15, 2019, for corresponding International Application No. PCT/JP2019/033994, 2 pages.
IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™-2016, 3534 pages.
Kim et al., "Spec text clarification for FDMA," IEEE 802.11-18/1121r3, Jul. 9, 2018, 10 pages.
Kim et al., "WUR Beacon transmission," IEEE 802.11-18/0716r0, May 7, 2018, 13 pages.
Liu et al., "Efficient FDMA MU Transmission Schemes for WUR WLAN," IEEE 802.11-17/1625rl, Oct. 10, 2017, 7 pages.

* cited by examiner

COMMUNICATION APPARATUS AND COMMUNICATION METHOD FOR DUTY CYCLED LOW POWER MULTI-USER TRANSMISSION

TECHNICAL FIELD

The present disclosure is generally related to a communication apparatus and a communication method.

BACKGROUND ART

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and coexists with legacy IEEE 802.11 devices in the same or different frequency band. The PCR may be any of the existing mainstream IEEE 802.11 amendments (802.11a, 802.11g, 802.11n or 802.11ac) or even other applicable future amendments (e.g. 802.11ax). The purpose of the WUR apparatus is to trigger the transition of the PCR apparatus out of sleep upon reception of a valid wake-up packet, while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one milliwatt, which is much lesser compared to the active receiver power consumption of the PCR apparatus. Devices with a WUR apparatus may be called WUR devices and WUR mode may refer to operation mode where only the WUR is in operation while the PCR is turned off. While operating in the WUR mode, the WUR receiver (WURx) may be always turned on, or the WURx may also operate in a duty cycle mode in which the WURx is duty cycled and only turned on during an awake period of the duty cycle. The 802.11ba Taskgroup is currently investigating WUR transmissions on multiple channels and Frequency Division Multiple Access (FDMA) technology to further improve the efficiency of the WUR transmission.

The IEEE 802.11ba amendment is primarily targeted at applications and Internet-of-Things (IOT) use cases in which the communication devices are usually powered by a battery and it is highly desirable to extend the battery lifetime while maintaining reasonably low latency. When large number of IOT devices need to be serviced by a single Access Point (AP), WUR transmissions on multiple channels and FDMA transmission may help to significantly improve the ability to quickly wake up multiple devices by making more efficient use of the available frequency resources. On the other hand operating WUR devices in duty cycle mode is beneficial from power saving point of view and hence the ability to use FDMA transmissions when WUR devices are operating in duty cycle mode is highly desirable.

CITATION LIST

Non Patent Literature

NPL 1: IEEE Std 802.11-2016
NPL 2: IEEE 802.11-17/0575r8, Specification Framework for TGba, November 2017
NPL 3: IEEE 802.11-17/1625r1, Efficient FDMA Transmission Schemes for WUR WLAN
NPL 4: IEEE 802.11-18/1121r3, Spec text clarification for FDMA

SUMMARY OF INVENTION

WUR transmissions on multiple channels and FDMA WUR transmission are effective methods to improve the transmission efficiency of WUR signals. FDMA WUR transmissions when used together with the duty cycle mode helps to save battery power for WUR non-AP devices. However, FDMA WUR transmission when used together with the duty cycle mode introduces some issues that need to be addressed for its' practical implementation.

One non-limiting and exemplary embodiment of the present disclosure facilitates providing means for practical implementation of FDMA transmission of WUR signals to WUR STAs operating in duty cycle mode. Although specific examples of WUR devices and signals are given, it should be easily understood that the disclosure applies equally well to other wireless systems in which wireless devices operate in duty cycle mode on multiple frequency channels.

In one general aspect, the techniques disclosed here features: a communication apparatus comprising: a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and a processor which, in operation, operates the duty cycle, wherein, during a determined time from the TWBTT, any WUR frame is not transmitted in the first channel from the AP.

It should be noted that general or specific embodiments may be implemented as a system, a method, an integrated circuit, a computer program, a storage medium, or any selective combination thereof.

The communication apparatus and communication method described in the present disclosure provides the means for practical implementation of FDMA transmission of WUR signals to WUR STAs operating in duty cycle mode. Although specific examples of WUR devices and signals are given, it should be easily understood that the disclosure applies equally well to other wireless systems in which wireless devices operate in duty cycle mode on multiple frequency channels.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
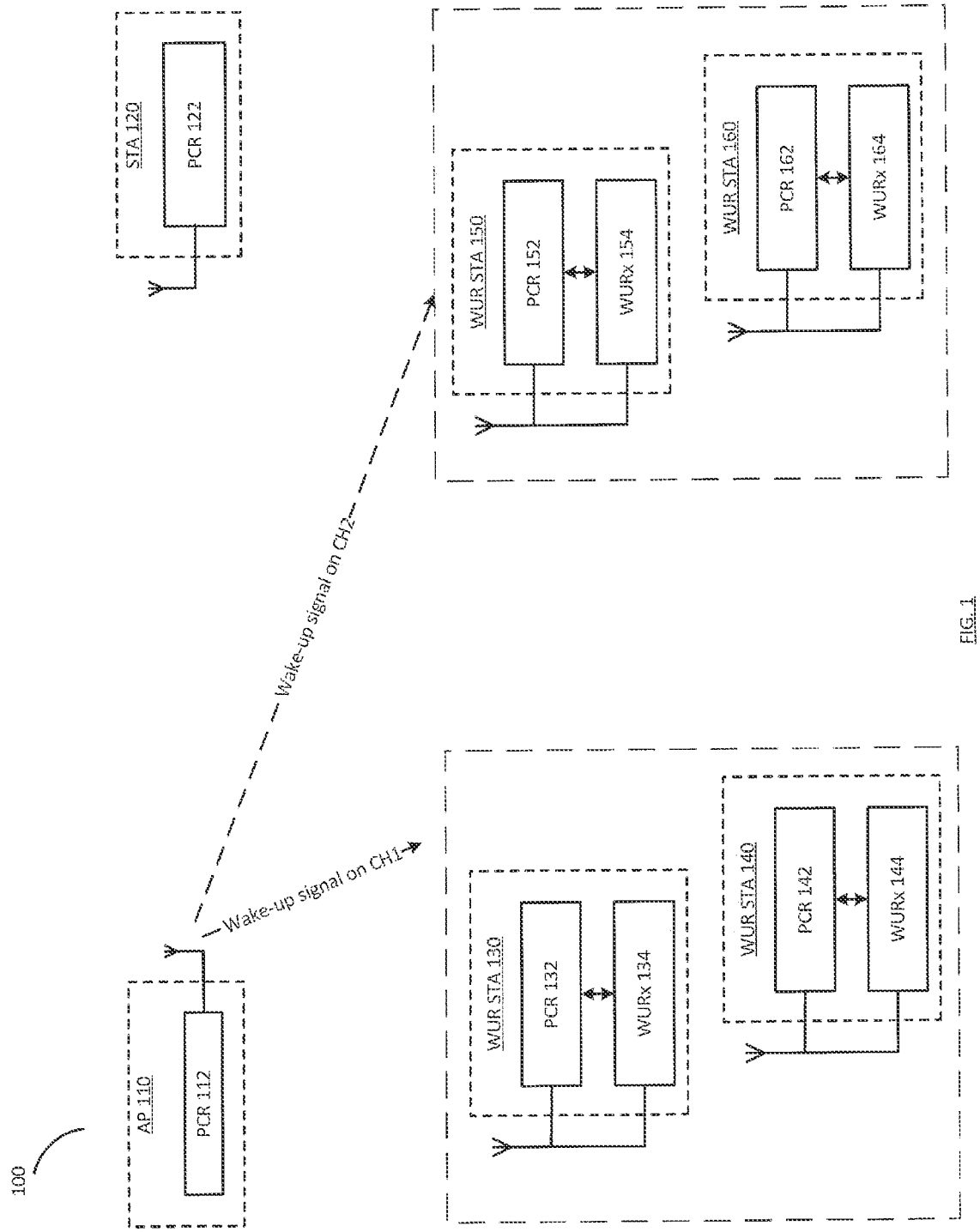
FIG. 1 shows an example heterogeneous 802.11 wireless network with a mixture of legacy 802.11 devices and WUR capable devices.

FIG. 1 shows an example of a wireless communication network 100 in which the present disclosure may be applied. The wireless communication may be based on popular wireless standards such as IEEE 802.11. The wireless communication network 100 may comprise an Access Point (AP) 110 and five stations (STA) 120, 130, 140, 150 and 160. Although in 802.11 terminologies, STA may refer to both AP as well as non-AP devices, however in this disclosure STA only refers to non-AP devices. The AP 110 is equipped with a Primary Connectivity Radio (PCR) apparatus (hereinafter stated simply as "PCR") 112 which is capable of transmitting and receiving wireless signals in the 802.11 waveform (e.g. Orthogonal Frequency Division Multiplexing (OFDM)) as well as being capable of transmitting wireless signals in the Wake-up radio (WUR) waveform (e.g. On-Off Keying (OOK)). STA 120 is a legacy 802.11 device that is only equipped with a PCR 122 capable of transmitting and receiving 802.11 signals whereas STAs 130, 140, 150 and 160 are WUR capable STAs and are equipped with PCRs 132, 142, 152 and 162 respectively as well as Wake-up radio receivers (WURx) apparatus (hereinafter stated simply as "WURx") 134, 144, 154 and 164 respectively. STAs 130, 140, 150 and 160 are capable of transmitting and receiving 802.11 signals and are also capable of receiving WUR signals. The PCRs 132, 142, 152 and 162 may only be turned on during active communication (PCR mode), while during period of idle listening, the PCRs may be turned off and only the WURx 134, 144, 154 and 164 may be operating (WUR mode). If the STAs are already associated with the AP 100, when the AP 110 needs to communicate with STAs operating in WUR mode, it may first transmit wake-up signal to instruct the STAs to transit to PCR mode by turning on the respective PCRs and switching off the WURx. Subsequently the AP and the STAs may perform communication over the PCR. Once the communication is over, the STAs may switch back to WUR mode by switching off the PCR and turning on the WURx. The wireless channel on which the AP 110 transmits Wake-up signals to the WURx of the WUR STAs may be called WUR channels. Although a single WUR channel may be used to transmit Wake-up signals to all the WUR STAs, in order to make the transmission of Wake-up signals more efficient, the AP 110 may also assign different WUR channels to the WUR STAs. For example WUR STAs 130 and 140 are assigned to WUR channel CH1 while WUR STAs 150 and 160 are assigned to WUR channel CH2.

Figure 2:
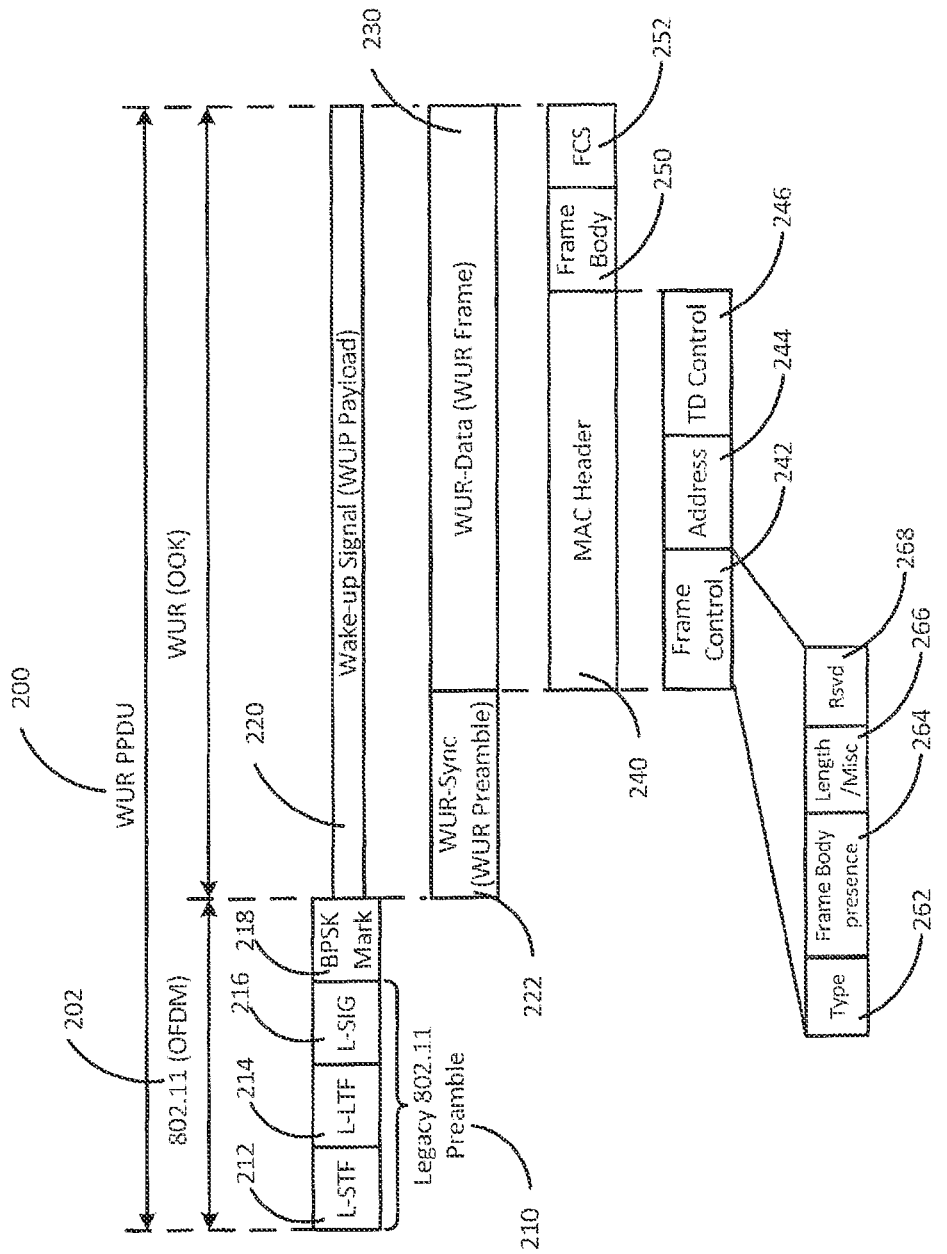
FIG. 2 shows the format of WUR PHY Protocol Data Unit (PPDU) being considered in the 802.11ba Taskgroup.

FIG. 2 shows the format of the wake-up signal being considered in the IEEE 802.11ba Taskgroup. The wake-up signal may be represented as the WUR PHY Protocol Data Unit (PPDU) 200. The WUR PPDU 200 is composed of two distinct portions. The first portion is comprised of a 20 MHz legacy (also known as non-high-throughput (HT)) 802.11 preamble 210 and one extra OFDM symbol 218 called BPSK Mark, which are transmitted in the 802.11 OFDM waveform over the entire 20 MHz channel. The second portion is the wake-up signal 220 which may also be referred to as wake-up packet (WUP) payload and is transmitted in a WUR OOK waveform in a narrower sub-channel within the 20 MHz channel, for example a 4 MHz sub-channel. Although only a single WUP Payload 220 is shown in FIG. 2, it is also possible that more than one, for example three WUP Payloads, are transmitted on different, non-overlapping sub-channels within the 20 MHz channel.

The legacy 802.11 preamble 210 provides coexistence with legacy 802.11 devices that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. The BPSK Mark 218 of duration 4 micro-seconds modulated in Binary Phase Shift Keying (BPSK) is transmitted right after the L-SIG 216 to prevent 802.11n devices from wrongly decoding the WUR PPDU 200 as being an 802.11n packet.

The WUP Payload 220 carries the actual wake-up signal and comprises a WUR preamble 222 and a WUR frame 230. The WUR preamble 222 may also be referred to as WUR- Sync while the WUR frame 230 may also be referred to as WUR-Data. The WUR preamble 222 is used for automatic gain control (AGC), timing synchronization, packet detection etc., while the WUR frame 230 carries the control information. The WUR frame 230 may be further composed of various sub-fields such as a MAC header 240, a Frame check sequence (FCS) 252 as well as the optional Frame body 250. The MAC header 240 may be further comprised of a Frame control field 242 that species the frame Type 262, a Frame Body presence bit 264, a Length/Misc. field 266 etc., an Address field 244 that may carry either one of the Transmitter Address, Receiver address or both, and a TD Control field 246. The TD Control field 246 may be used to carry different control information depending on the frame Type. For example in WUR beacon frames, the TD Control field 246 may carry a timestamp field, while in unicast WUR frames, the TD Control field 246 may carry a packet number etc. The WUR frame 230 may be transmitted using either low data rate (LDR) of 62.5 kb/s or high data rate (HDR) of 250 kb/s. The data rate used for the WUR frame 230 is indicated by pre-defined sequences in the WUR-Sync field 222. Manchester-based code is applied to both WUR data rates and Multicarrier On-Off Keying (MC-OOK) is used for modulation of both WUR data rates.

Figure 3:
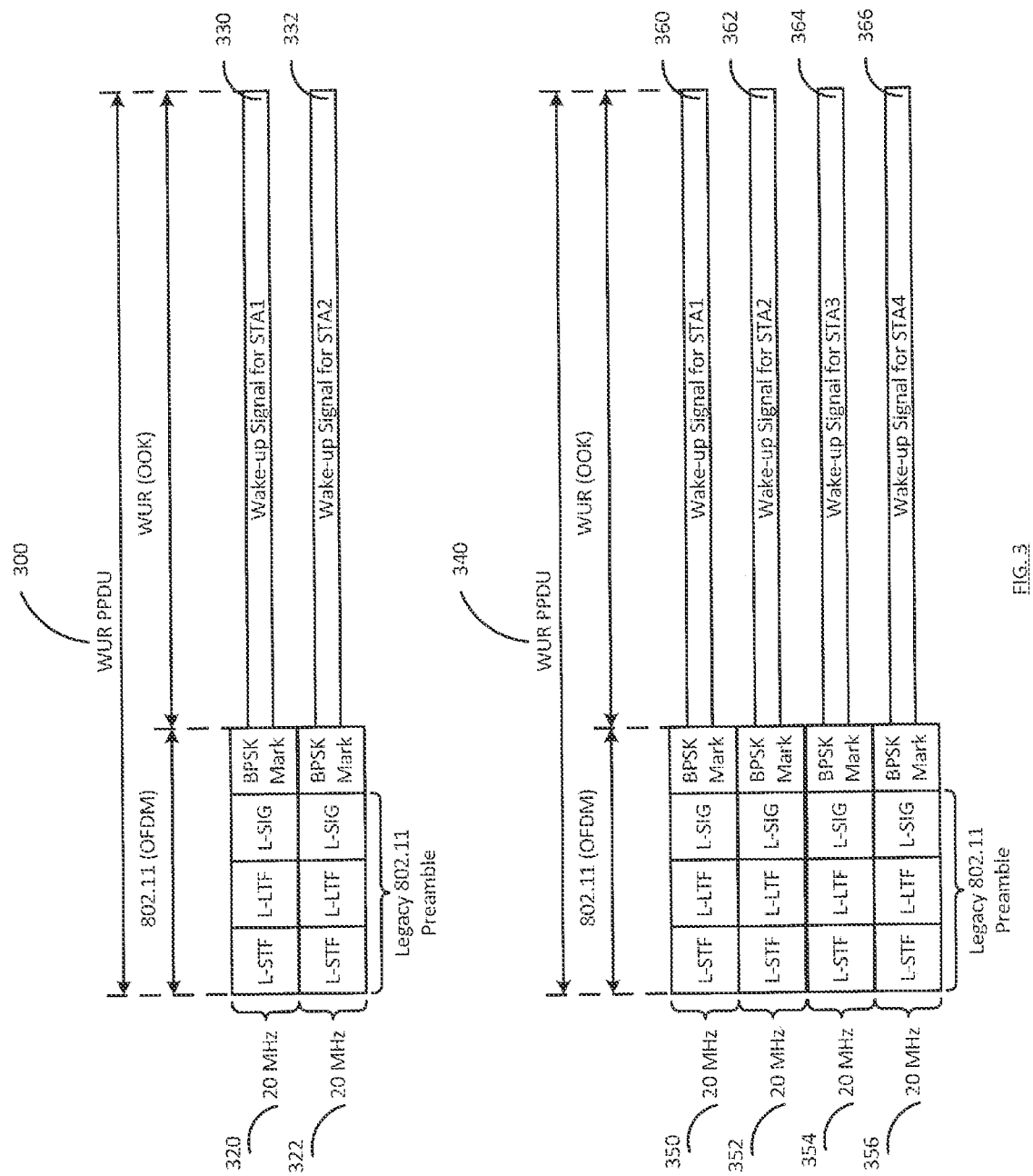
FIG. 3 shows two possible WUR FDMA transmission schemes.

As shown in FIG. 1, it is possible that more than one WUR channel may be defined in a wireless network to improve the transmission efficiency of Wake-up signals. When multiple WUR channels are available for transmission of Wake-up signals, Frequency Division Multiple Access (FDMA) may be utilized for efficient transmission of Wake-up signals. Methods to achieve WUR FDMA transmissions is shown in FIG. 3 in which multiple 20 MHz 802.11 channels may be used in the BSS to simultaneously carry WUR signals. Since a single WUR channel is defined within a 20 MHz 802.11 channel, the 20 MHz channel itself may be referred to as a WUR channel even though only a narrow portion of the 20 MHz channel is actually used for transmission of Wake-up signal. When multiple 20 MHz 802.11 channels are contiguous in the frequency domain, multiple Wake-up signals may be transmitted simultaneously. In the special case of the non-contiguous 80+80 MHz channel, multiple Wake-up signals may be also transmitted simultaneously within each contiguous 80 MHz within the 80+80 MHz channel. Two examples of FDMA WUR transmission are shown in FIG. 3. WUR PPDU 300 is an example of a WUR PPDU that simultaneously carries two Wake-up signals over 40 MHz by using FDMA WUR transmission scheme. Two WUR STAs, WUR STA1 and WUR STA2 are assigned on adjacent WUR channels 320 and 322 respectively. The legacy 802.11 preamble and the BPSK Mark symbols of the WUR PPDU 300 are duplicated on each 20 MHz channel and transmitted over the entire 40 MHz similar to the non-HT duplicate PPDU format in 802.11n and 802.11ac. Wake-up signal 330 is addressed to WUR STA1 and is transmitted on the WUR channel 320 while Wake-up signal 332 is addressed to WUR STA2 and is transmitted on the WUR channel 322.

Similarly, WUR PPDU 340 is an example of a WUR PPDU that simultaneously carries four Wake-up signals over 80 MHz by using FDMA WUR transmission scheme. Four WUR STAs, WUR STA1, WUR STA2, WUR STA3 and WUR STA4 are assigned on adjacent WUR channels 350, 352, 354 and 356 respectively. The legacy 802.11 preamble and the BPSK Mark symbols of the WUR PPDU 340 are duplicated on each 20 MHz channel and transmitted over the entire 80 MHz. Wake-up signal 360 is addressed to WUR STA1 and is transmitted on the WUR channel 350, Wake-up signal 362 is addressed to WUR STA2 and is transmitted on the WUR channel 352, Wake-up signal 364 is addressed to WUR STA3 and is transmitted on the WUR channel 354 while Wake-up signal 366 is addressed to WUR STA4 and is transmitted on the WUR channel 356. In terms of the capabilities of WUR STAs, since only one WUR channel is allocated per 20 MHz channel, the WUR STAs are not required to have any special hardware capabilities to be able to receive Wake-up signals transmitted in the Wide band FDMA scheme.

Figure 4:
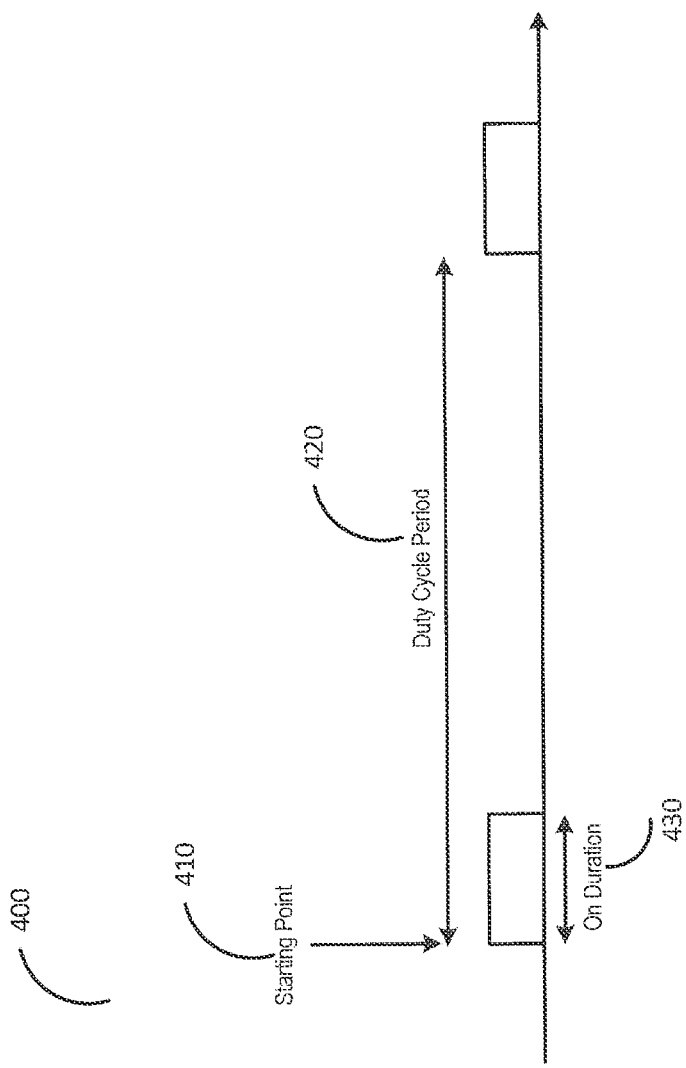
FIG. 4 shows a WUR duty cycle operation.

FIG. 4 shows the parameters involved in a WUR duty cycle operation 400. When a WUR STA is operating in the WUR mode (i.e. its PCR is in doze mode), the WUR receiver (WURx) may be always in awake state i.e. always turned on, or the WURx may also operate in a duty cycle mode in which the WURx is duty cycled and only turned on during an awake period of the duty cycle. This may be referred to as WUR duty cycle operation. WUR duty cycle operation 400 is determined by the following parameters: Starting Point 410, On Duration 430, Duty Cycle Period 420 and the WUR channel. Starting Point 410 indicates the timestamp of the start of the WUR Duty cycle. On Duration 430 is the duration during which the WURx of a WUR STA running in duty cycle mode is in the WURx awake state. On Duration 430 may also be known by alternative names such as awake period or active period etc. The Duty Cycle Period 420 indicates the period of the duty cycle and determines how often the On Duration occurs. In a WUR Duty cycle operation, the On Duration 430 occurs at the start of each Duty Cycle period 420 and may also be known as a duty cycle schedule. The ratio of the On Duration 430 and the Duty Cycle Period 420 is commonly known as the duty cycle ratio and determines the aggressiveness of a power save scheme. A WUR STA operating in a Duty Cycle Operation with the duty cycle ratio less than 1 may be referred to as a Duty Cycled WUR STA. In the special case where the duty cycle ratio is equal to 1 i.e. the On Duration 430 is equal in length to the Duty Cycle Period 420, the WURx is always in the awake state and never goes to the doze mode during the WUR mode and such WUR STAs are simply known as Always On WUR STAs henceforth in this document. The WUR Channel refers to the 20 MHz 802.11 channel used to carry the Wake-up signals addressed to the WUR STA.

Several exemplary embodiments are described in detail in later sections to describe the disclosure in detail. The various embodiments for practical implementation of FDMA transmission of WUR signals to WUR STAs operating in duty cycle mode as per the present disclosure are described in detail in the following sections.

First Embodiment

Figure 5:
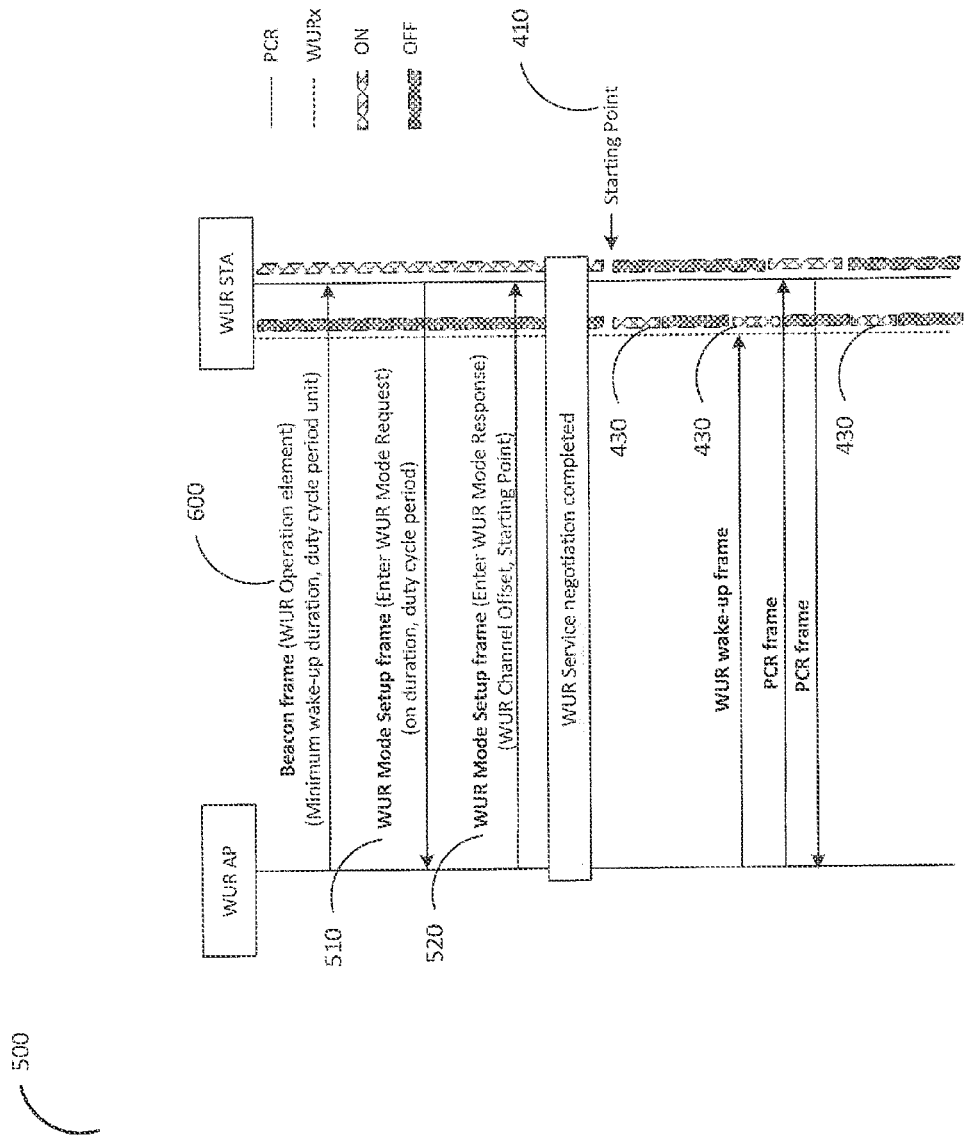
FIG. 5 shows the frame exchange sequence involved in the WUR Mode setup negotiation.
Figure 6:
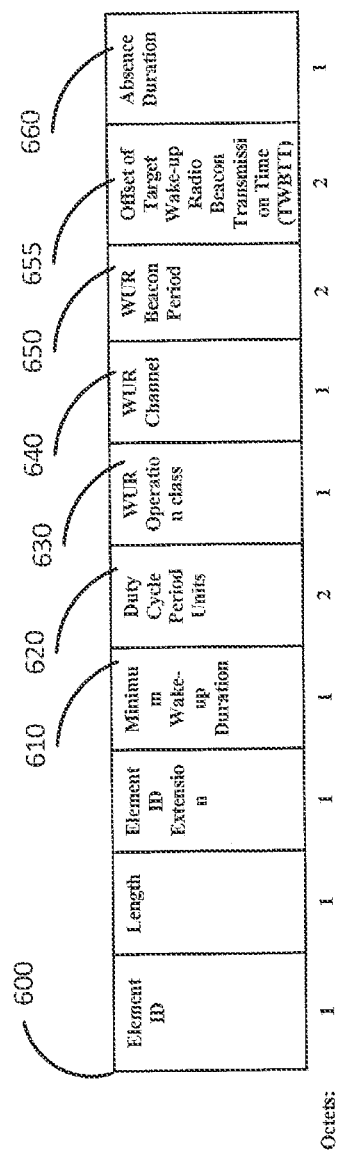
FIG. 6 shows the WUR Operation element used by the AP to advertise the various parameters in use for the operation of the wireless network as per a first embodiment.
Figure 7:
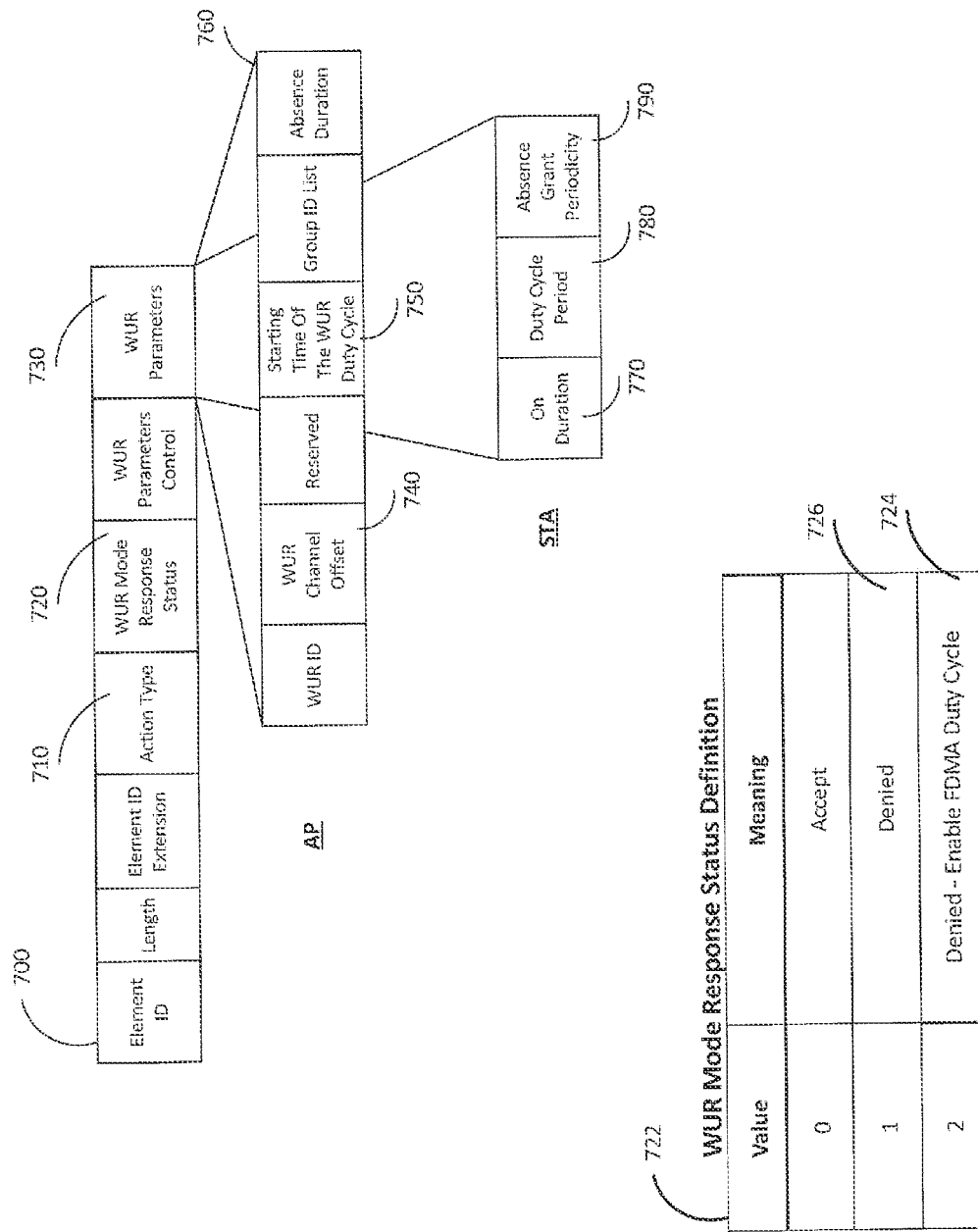
FIG. 7 shows the WUR Mode element used to negotiate the parameters related to WUR operation between the AP and associated WUR STAs as per the first embodiment.

FIG. 5 shows the frame exchange between a WUR AP, which may be the AP 110 in FIG. 1, and a WUR STA, which may be any of WUR STAs 130, 140, 150 or 160, to setup the WUR service (or WUR Mode). Initially, the WURx of the WUR STA may be turned off and only its PCR may be running. The WUR AP advertises the common parameters to be used for WUR operation, for example by including the WUR Operation element 600 in Beacon frames, Probe Response frames etc. FIG. 6 shows the WUR Operation element 600 that an AP may include in the Beacon frame or Probe Response frames etc. to advertise the common parameters to be used for WUR operation. The Minimum Wake-up Duration field 610 indicates the minimum duration that a WUR STA in duty cycle operation must remain in the WURx awake state during an On Duration 430. The Duty Cycle Period Units field 620 indicates the basic unit of the Duty Cycle Period 420. The WUR Operating Class field 630 and the WUR Channels field 640 together indicate the WUR Channel that is used for transmission of the WUR Beacon frame and may be known as the WUR Primary channel. The WUR Beacon Period field 650 indicates the interval between two consecutive WUR Beacon frames transmitted on the WUR Primary channel. The Offset of Target Wake-up Radio Beacon Transmission Time (TWBTT) field 655 indicates the time offset of the first TWBTT from TSF (Time Synchronization Function) 0. The Offset of Target Wake-up Radio Beacon Transmission Time (TWBTT) field 655 together with the WUR Beacon Period field 650 enables a WUR STA to calculate the series of TWBTTs and hence the next transmission time of the WUR Beacon. The WUR channel used to transmit WUR Beacon frames may also be referred to as the WUR Beacon channel or WUR Broadcast channel. A WUR STA initiates the negotiation of WUR service setup by transmitting to the WUR AP, the WUR Mode Setup frame 510 that carries the WUR Mode element 700 in FIG. 7 in which the Action field 710 is set to Enter WUR Mode Request. FIG. 7 shows the WUR Mode element 700 used to negotiate the parameters related to WUR service between the AP and associated WUR STAs. A WUR STA uses the WUR Mode element 700 to request setup of WUR service with the AP and to negotiate the parameters related to WUR operation such as the preferred On Duration 430, desired Duty Cycle Period 420 etc. by setting the On Duration field 770 and the Duty Cycle Period field 780 to appropriate values. A WUR STA may also set the On Duration 770 equal or larger in length to the Duty Cycle Period 780 to signal its intention to have its WURx always in the awake state and never goes to the doze mode during the WUR mode, i.e. the WUR STA intends to operate as an Always On WUR STA. If the AP approves the request to setup WUR operation, the AP transmits the WUR Mode Setup frame 520 that carries the WUR Mode element 700 in FIG. 7 in which the Action field 710 is set to Enter WUR Mode Response. The AP sets the WUR Mode Response Status field 720 to a value that indicates Accept as listed in table 722. In addition, the WUR AP uses the WUR Parameters field 730 within the WUR Mode element 700 to inform the WUR operation parameters specific to the WUR STA. The WUR ID field indicates the WUR Identifier that uniquely identifies the WUR STA within the BSS. The WUR Channel Offset field 740 indicates the 20 MHz 802.11 channel used to carry the Wake-up signals addressed to the WUR STA. The Starting Time of the WUR Duty Cycle field 750 indicates the timestamp of the Starting Point 410 of the Duty Cycle Operation. In IEEE 802.11 systems, 8 octets are used to track the system timestamp, however the Starting Time of the WUR Duty Cycle field 750 may use lesser number of octets for efficiency, and in some cases the signaled value in the field 750 and actual timestamp of the Starting Point 410 may be different and further processing is required to obtain the actual timestamp of the Starting Point 410 as will be explained in later sections.

Figure 8:
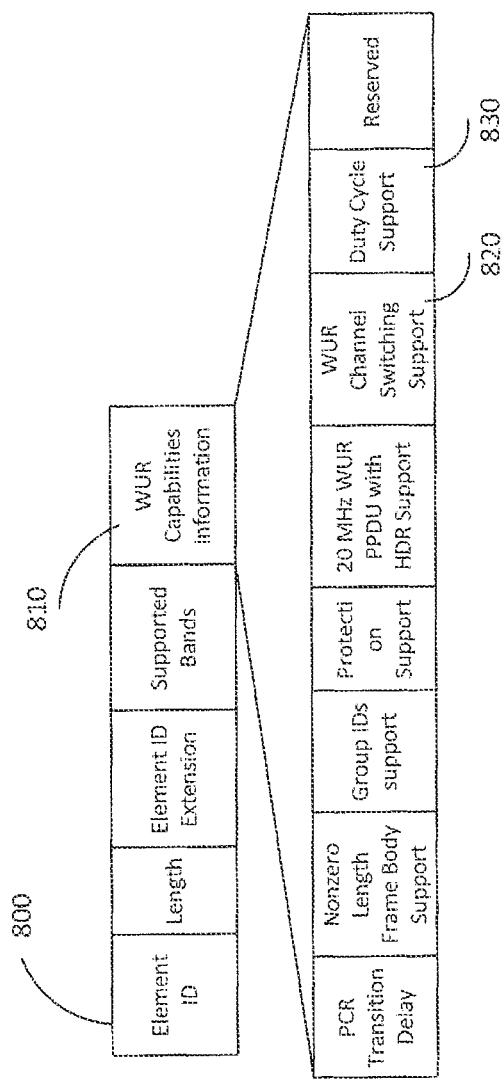
FIG. 8 shows the WUR capabilities element used to indicate the various capabilities of the WUR AP and WUR STAs as per the first embodiment.

FIG. 8 shows the WUR capabilities element 800 used to indicate WUR related capabilities. The WUR Capabilities field 810 carries the various parameters related to WUR capabilities of WUR STAs. The WUR Channel Switching Support field 820 indicates whether a WUR STA is capable of switching WUR channels to receive WUR frames transmitted on another WUR channel, for example WUR Beacon frames transmitted on the WUR Primary channel. This capability implicitly indicates to the WUR AP whether a WUR STA may be assigned to a WUR channel other than the WUR primary channel and also if WUR FDMA PPDUs may be used to carry WUR signals for the WUR STA. A WUR STA that does not set this field can only be assigned to the WUR Primary channel. The Duty Cycle support field 830 is used by a WUR STA to indicate whether or not it is capable of Duty Cycle Operation.

Figure 9:
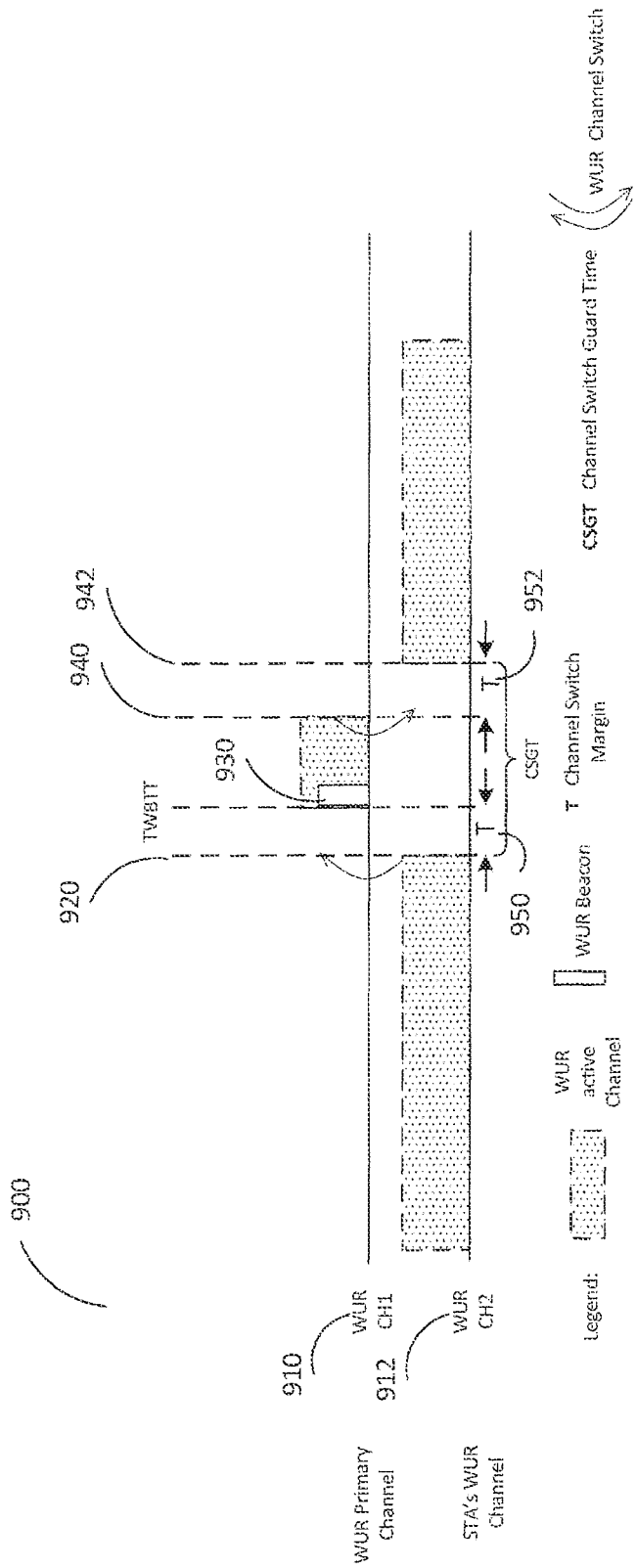
FIG. 9 shows an example scheme for transmission of scheduled broadcast WUR frames when multiple WUR channels are defined as per the first embodiment.

As mentioned earlier, when multiple WUR channels are in operation within a BSS, WUR STAs that have set the WUR Channel Switching Support field 820 may be assigned to WUR channels other than the WUR Primary channel. Since a WUR STA only listens to its assigned WUR channel while it is operating in the WURx awake state (for example during the On Duration 430 of a Duty Cycle period), the WUR STA may not receive broadcast WUR frames transmitted by the AP on other WUR channels. Since broadcast WUR frames are meant to be received by all WUR STAs in the BSS, missing them may have adverse effects on WUR STAs operation, such as loss of time synchronization. FIG. 9 shows the transmission scheme 900 that may be used as a skilled person's solution to overcome the challenge of receiving scheduled broadcast WUR frames by WUR STAs. Two WUR Channels, WUR CH1 910 and WUR CH2 912 are defined in the BSS. WUR CH1 910 is designated as the WUR Primary channel by the AP 110 and advertised in the BSS through the WUR Operation class 630 and the WUR Channel field 640 of the WUR Operation element 600, while WUR CH2 912 is assigned to a WUR STA, for example the WUR STA 150 in FIG. 1, by setting the WUR Channel Offset field 740 in the WUR Mode element 700 carried by the WUR Mode Setup frame 520 during the WUR Mode negotiation 500 between the AP 110 and WUR STA 150. All the WUR STAs in the BSS would be aware of the next Target WUR Beacon Transmission Time (TWBTT) which is the expected transmission time of the next WUR Beacon by the AP. The WUR Beacon frame 930 is only transmitted on the WUR Primary channel WUR CH1 910. Initially the WUR STA 150 has its WURx tuned to its assigned WUR channel WUR CH2 912. When the two WUR channels are within the same frequency bands, for most WUR STAs switching from WUR CH2 912 to WUR CH1 910 may simply be a matter of tuning the WURx's frequency synthesizer without the need to change the oscillator and as such may not take much time and may have minimum impact on the WUR STA's power consumption. However when the two WUR channels are in different frequency bands, or for very low capability WUR STAs that use ultra-low power PLL synthesizer that require long lock-up time (e.g. more than 100 microsecond), the Channel Switch Margin 950 may not be ignorable. WUR STA 150 needs to take the Channel Switch Margin 950 into consideration when deciding the time 920 to switch to WUR CH1 to make sure that its WURx is tuned to WUR CH1 at TWBTT in time to receive the WUR Beacon frame 930. At time 920, slightly before the expected TWBTT and considering its Channel Switch Margin 950, WUR STA 150 may switch its WURx to the WUR Primary channel WUR CH1 910 and wait for the WUR Beacon frame 930. Once the WUR Beacon frame 930 has been received, at time 940 WUR STA may switch back to its assigned WUR channel WUR CH2 912. The WUR STA 150 may also switch back to its assigned WUR channel, if the WUR Beacon is not received within a certain timeout period from the expected TWBTT. Here too the Channel Switch Margin 952 applies and the WURx of WUR STA 150 may only be ready to receive WUR frames on WUR CH2 912 at time 942. Since the AP 110 needs to contend for the wireless channel to transmit WUR Beacon frames, the timeout period should be large enough to cater for possible channel access delays at the AP. The maximum time period that a WUR STA 150 may be unavailable to receive WUR frames on its assigned WUR channel due to the WUR STA's WURx switching channel to the WUR Primary channel may be referred to as Channel Switch Guard Time (CSGT). CSGT gives an upper bound on the time that a WUR STA stays away from its assigned WUR channel, starting from time at which it switches to the WUR Primary channel to wait for the WUR Beacon and ending at the time that the WUR STA switches back to its assigned WUR channel, either upon receiving the scheduled WUR frame or upon expiration of a timeout period. Referring to FIG. 9, CSGT covers the time period starting at time 920 when the WUR STA 150 switches to the WUR Primary channel WUR CH1 910 and ending at time 942 which is the latest time by which WUR STA 150 should be back on its assigned WUR channel WUR CH2 912 and includes both Channel Switch margins 950 and 952. Since CGST needs to factor in various parameters related to a WUR STA's hardware capabilities such as the time required to switch channels, the time required to compensate for the WUR STA's clock drift etc., the CGST may vary greatly from WUR STA to WUR STA. The value of a WUR STA's CGST may also vary depending on whether the WUR Primary Channel and the WUR STA's assigned WUR channel are on the same or different frequency bands. An AP needs to ensure that it does not transmit any WUR frames to a WUR STA during the CGST. Also, at present there are no mechanisms in 802.11ba for WUR STAs to report their relevant hardware capabilities to the APs. As can be seen, due to these factors there may be some uncertainty regarding how long the CGST should be and it can be expected that the AP will choose a larger value rather than a smaller value in order to support low capability WUR STAs. Since the CGST represents the time period that a WUR STA is unable to receive any WUR frames on its assigned channel, this creates disruption in WUR service for the WUR STA. This is especially relevant for an Always On WUR STA since an Always On WUR STA operates in the WURx awake state during the entire time it is in WUR mode (since the On Duration 430 is equal to the Duty Cycle period 420 for an Always On WUR STA). On the other hand, WUR STAs that operate in duty cycle mode where the On Duration 430 is smaller than the Duty Cycle period 420, may minimize such disruptions by tuning their Duty Cycle Operation parameters such that the CGST occurs in the time period outside the On Duration 430. As a result of this potential disruption in WUR service due to channel switching, Always On WUR STAs may not be assigned to channels other than the WUR Primary channel even if they are capable of switching WUR channels, as indicated by the WUR Channel Switching Support field 820 in their WUR Capabilities elements. This however means that the WUR Primary channel will likely be more crowded. Considering that it is optional for WUR STAs to support the Duty Cycle Operation, in the worst case scenario, if all the WUR STAs in a BSS operate as Always On WUR STAs, all the WUR STAs may be assigned to the WUR Primary channel, and the AP may not able to distribute the WUR signaling load to other less used WUR Channels and consequently WUR FDMA PPDUs may not be used in the BSS at all.

Figure 10:
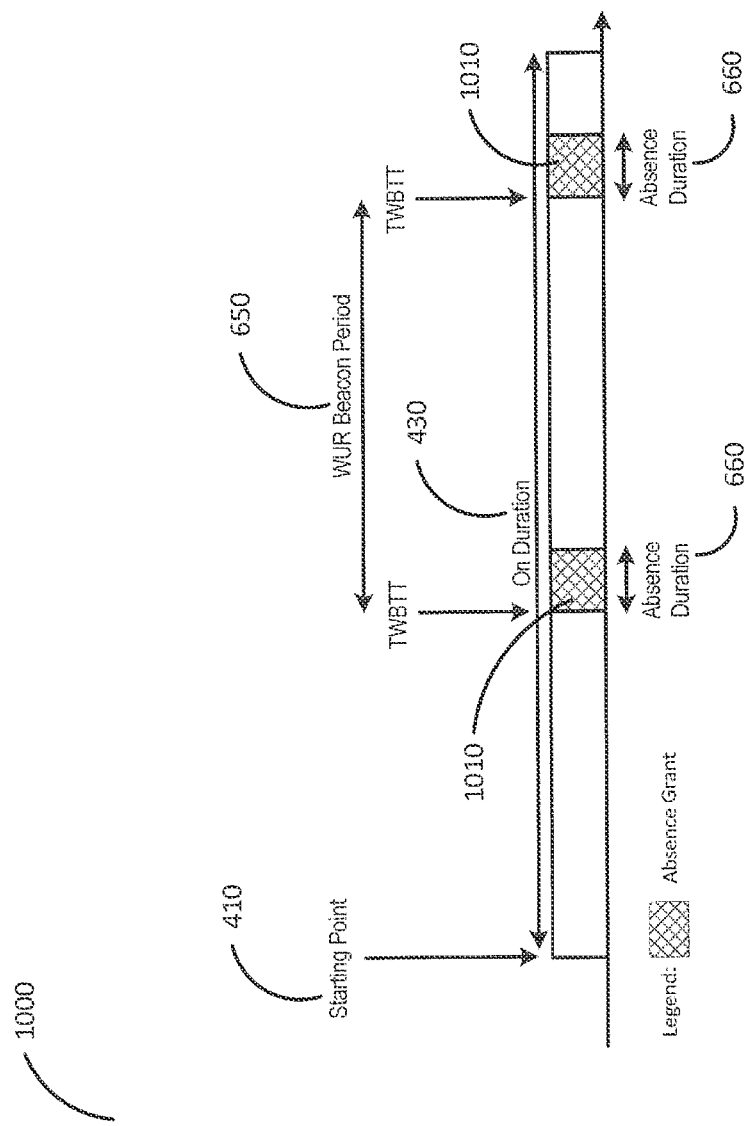
FIG. 10 shows a scheme for the WUR duty cycle operation as per the first embodiment.

FIG. 10 shows a proposed method 1000 of reducing the uncertainties due to WUR channel switching by defining well known periods of time during a WUR STA's On Duration 430 during which the WUR STA is permitted to switch its WURx to listen to a WUR channel other than its assigned WUR channel (assuming the WUR STA has set the WUR Channel Switching Support field 820 in the WUR Capabilities element 800). Each of these periods of time may be known as an Absence Grant 1010, and one or more Absence Grants may be provided during the On Duration 430 in each Duty Cycle Period. The time duration of each Absence Grant may be known as Absence Duration and may be advertised by the WUR AP using the Absence Duration field 660 in the WUR Operation elements 600 and is assumed to be known to all WUR STAs associated with the WUR AP. According to the first embodiment, one Absence Grant starts at each TWBTT that occurs during the On Duration 430 and repeats with the periodicity of WUR Beacon Period 650. Alternatively, it is also possible to only define a single Absence Grant during a Duty Cycle Period 420, for example to start at the first TWBTT that overlaps the On Duration 430. Since the Duty Cycle Period is a variable that can be controlled by the WUR STA 150, this may allow the STA to have some control over how often the Absence Grants occur. The Absence Duration 660 is calculated by the WUR AP to be long enough for WUR STAs to switch to the WUR Primary channel to receive the WUR Beacon frame 930 at TWBTTs and switch back to its assigned WUR channel, factoring clock drifts, typical WUR channel switch margins as well as average channel access delays for WUR Beacon transmissions. Although the value of the Absence Duration 660 is expected to be unchanged during the lifetime of a BSS, it is also possible that a WUR AP may adjust this value, for example based on changes in the channel conditions in the WUR Primary channel. As such, a WUR STA shall use the value obtained in the latest Absence Duration field 660. Alternatively, it is also possible that the Absence Duration may be a well-known value, for example aWURAbsenceDuration, or a Management Information Base (MIB) value dot11WURAbsenceDuration defined in the IEEE 802.11ba specification. Or, it is also possible that a default value for the Absence Duration is defined by the IEEE 802.11ba specification, but the default value may be over ridden by the AP if needed by advertising a different value using the Absence Duration field 660 in WUR Operation element 600. During an Absence Grant, a WUR STA may switch its WURx to listen to a different WUR channel, for example to the WUR primary channel to receive WUR Beacon frames at TWBTTs. Alternatively, the WUR STA may also choose to transition to the WUR doze state for the duration of the Absence Grant (assuming it is capable of operating in duty cycle mode), or the WUR STA may also choose to simply continue listening on its assigned WUR channel. WUR STA are expected to be back on its assigned WUR channel and ready to receive WUR frames on its assigned WUR channel at the end of an Absence Grant. In other to ensure that a WUR STA does not miss any WUR frames individually addressed to it, the WUR AP needs to ensure that it does not transmit any individually addressed WUR frame to a WUR STA on its assigned WUR channel during an Absence Grant. Having such well-defined Absence Grant periods reduce the uncertainties due to WUR channel switching and allows the WUR AP to assign WUR STAs whose On Duration 430 overlaps the TWBTT, for example Always On WUR STAs, to a WUR channel other than the WUR Primary channel and subsequently use WUR FDMA PPDUs to transmit WUR frames to such STAs (assuming the WUR STA has set the WUR Channel Switching Support field 820 in the WUR Capabilities element 800).

Figure 11A:
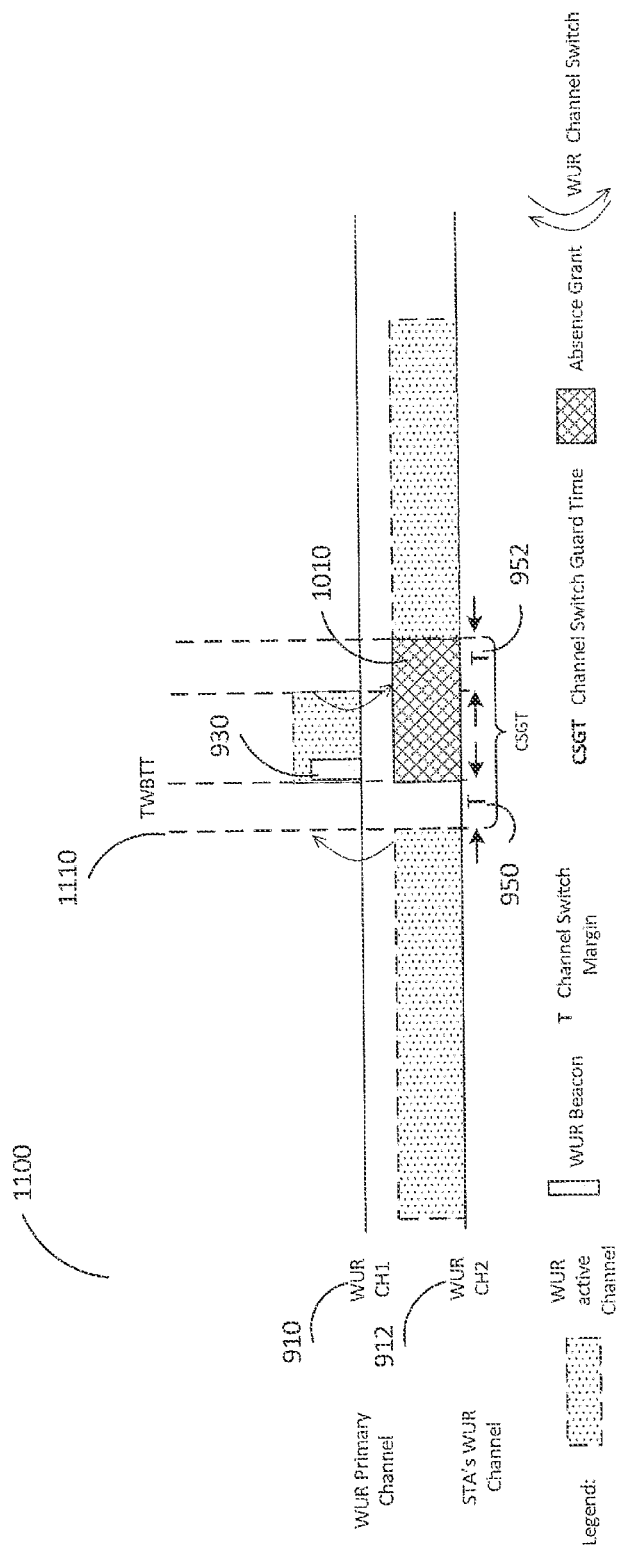
FIG. 11A shows the WUR channel switching during the WUR duty cycle operation as per the first embodiment.

Referring to FIG. 11A, earlier it was mentioned that the Channel Switch Margins 950 and 952 may depend on a WUR STA's hardware capabilities and hence there is a need to consider the Channel Switch Margins 950 and 952 to determine the CSGT. Especially if the Channel Switch Margin is larger than the Wake-up Signal 220 carried in a WUR PPDU, there is a possibility that if the WUR PPDU carrying a WUR frame addressed to the WUR STA is transmitted right before or near to the time 1110, since the WUR STA may be in the process of switching channels, it may completely miss the WUR frame addressed to it. In such case, it is especially important that the WUR AP considers the Channel Switch Margin 950 when scheduling WUR PPDUs for the WUR STA. However, since the smallest possible WUR frame size defined in IEEE 802.11ba is at least 128 microsecond long, and considering that a WUR STA with reasonable hardware capabilities would be expected to have Channel Switch Margin 950 much less than 100 microsecond, it can be safely assumed that the WUR STA will be able to successfully receive and decode (either fully or partially) WUR PPDUs transmitted near to the TWBTTs. When a valid WUR frame is received, the WUR STA may even decide to switch to the PCR mode (i.e. turn its PCR to the awake state while putting its WURx in the doze state) and abandon the WUR channel switch during the Absence Grant 1010. Under such assumptions, the Channel Switch Margin 950 need not be explicitly included in the Absence Grant 1010 thereby allowing Absence Grants to start right at TWBTTs. This not only simplifies the calculations but also reduces the uncertainties due to Channel Switch margins. It should be noted however that the Channel Switch Margin 952 still needs to be considered as part of the Absence Grant, allowing WUR STAs enough time, following the reception of WUR Beacon frame 930, to switch back to their assigned WUR channels before the end of the Absence Grant 1010.

Figure 11B:
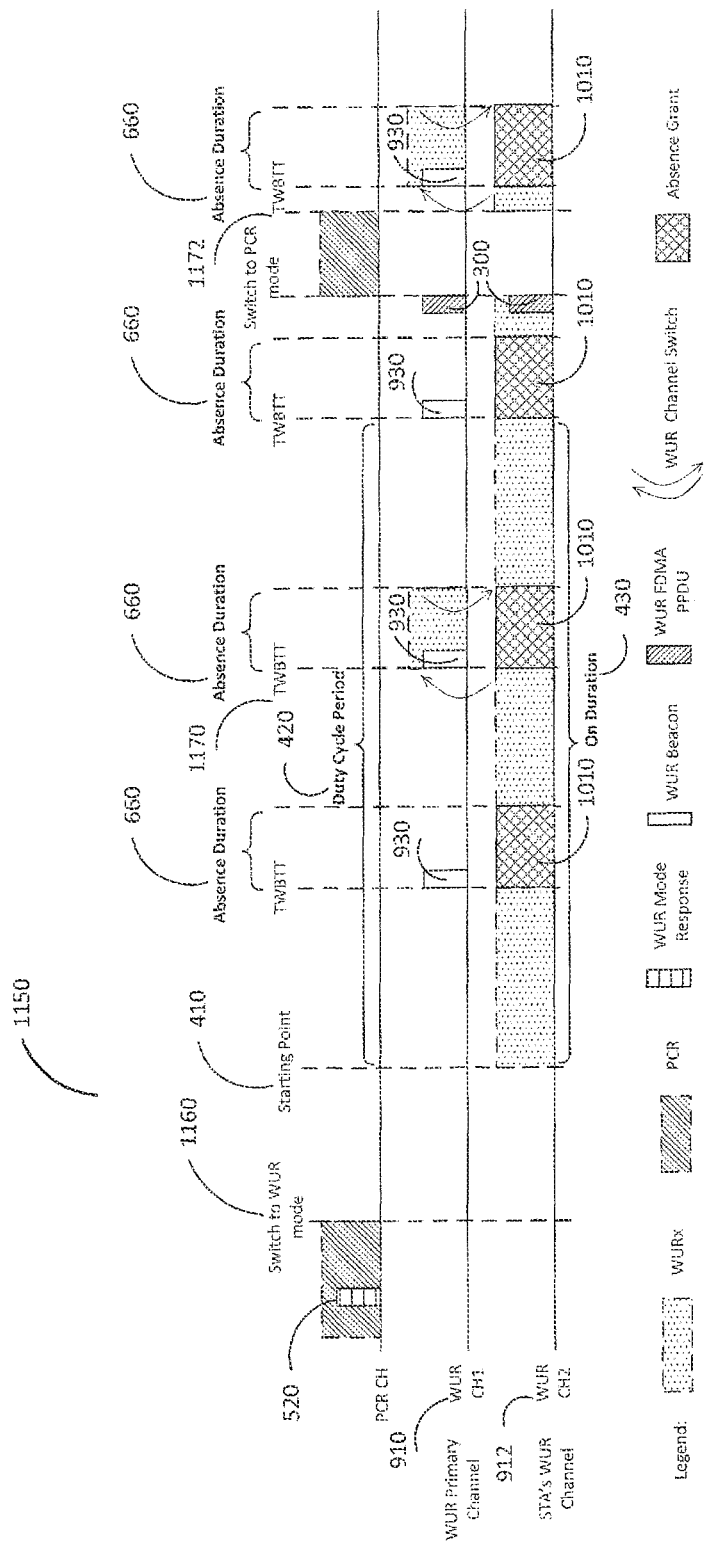
FIG. 11B shows an example frame transmission sequence between a WUR AP and a WUR STA operating in the WUR duty cycle operation as per the first embodiment.

Referring to FIG. 11B, an example transmission sequence 1150 is shown to illustrate the proposed method 1000 for the special case of an Always On WUR STA. Although not shown in FIG. 11B, a WUR STA for example the WUR STA 150 in FIG. 1 would initially be operating in the PCR mode and first receives the parameters necessary to operate in WUR mode (Minimum Wake-up Duration, Duty Cycle Period Units, WUR channel, WUR Beacon Period, TWBTT offset, Absence Duration etc.) through the WUR Operation element 600 carried in the Beacon frames or Probe Response frames transmitted by an AP, for example AP 110. The WUR STA 150 then initiates the WUR mode setup by transmitting the WUR Mode setup frame 510 to AP 110 in which the On Duration field 770 is set equal or larger in length than the Duty Cycle Period field 780 to signal its intention to have its WURx always in the awake state and never go to the doze mode during the WUR mode, i.e. the WUR STA 150 intends to operate as an Always On WUR STA. If the AP 110 accepts the WUR mode setup request, it transmits the WUR Mode setup frame 520 to the WUR STA with the WUR Mode Response Status field 720 set to Accept. The AP 110 also sets the WUR Channel Offset 740 to assign the WUR STA 150 to WUR CH2 912, and the Starting Time Of The WUR Duty Cycle field 750 to indicate the Starting Point 410 of the first On Duration 430. If the WUR STA 150 had set the On Duration field 770 to a value larger in length than the Duty Cycle Period 780 (for example due to mismatch in Duty Cycle Period units), the AP 110 will consider both the On Duration 430 and the Duty Cycle Period 420 as equal to the value indicated in the Duty Cycle Period 780. Upon receiving and acknowledging the frame 520, the WUR STA 150 may switch to the WUR mode at time 1160 by putting its PCR in the doze state. At the same time it also turns on its WURx and tunes it to the assigned WUR CH2 912 such that it is ready to receive WUR frames from AP 110 by the Starting Point 410. In order to minimize any disruption in service, the WUR STA 150 may choose the time 1160 to be very close to Starting Point 410. Between time 1160 and the time the frame 520 was received, the WUR STA continues to operate in the PCR mode that the WUR STA 150 has currently negotiated with the AP 110. If the WUR STA is concerned about saving power, it may also choose 1160 to be as close as possible to the time the frame 520 was received. This however may mean that the AP 110 is unable to communicate with the WUR STA 150 between time 1160 and the Starting Point 410, especially if the WUR STA 150 also has its WURx in the doze state during this time. At time 410, the WUR STA has its WURx in the awake state on its assigned channel WUR CH2 912, ready to receive WUR frames from AP 110. In this example, there are at least two TWBTTs that overlap every On Duration period 430 and an Absence Grant 1010 starts at each TWBTT, the time duration of each Absence Grant being equal to the value indicated by the Absence Duration field 660. However, WUR STA 150, depending on its clock accuracy and synchronization requirements, may not need to receive the WUR Beacon 930 at every TWBTT and may only choose to switch to the WUR Primary channel to receive the WUR Beacon 930 at alternate TWBTTs 1170 and 1172. During the Absence Grants that starts at the other TWBTTs, the WUR STA 150 may choose to transition to the WUR doze state for the duration of the Absence Grant, or the WUR STA 150 may also choose to simply continue in the WURx awake state. However, during these Absence Grants, the AP 110 will not transmit any WUR frame addressed to the WUR STA 150 on WUR CH2 912. Although Absence Duration is calculated starting from TWBTT, the WUR STA 150 may need to switch to the WUR primary channel a little earlier, factoring its clock drifts, Channel Switch margin etc. to ensure its WURx can listen to the WUR primary channel WUR CH1 910 in time to receive the WUR Beacon frames 930. The AP 110 may also transmit a 40 MHz WUR FDMA PPDU 300 (at a time outside the Absence Grants) that carries a Wake-up frame addressed to the WUR STA 150 on WUR CH2 912. Upon receiving the Wake-up frame, the WUR STA 150 switches to the PCR mode to receive PCR frames from the AP 110, if any, before transitioning back to the WUR mode.

Second Embodiment

Figure 12:
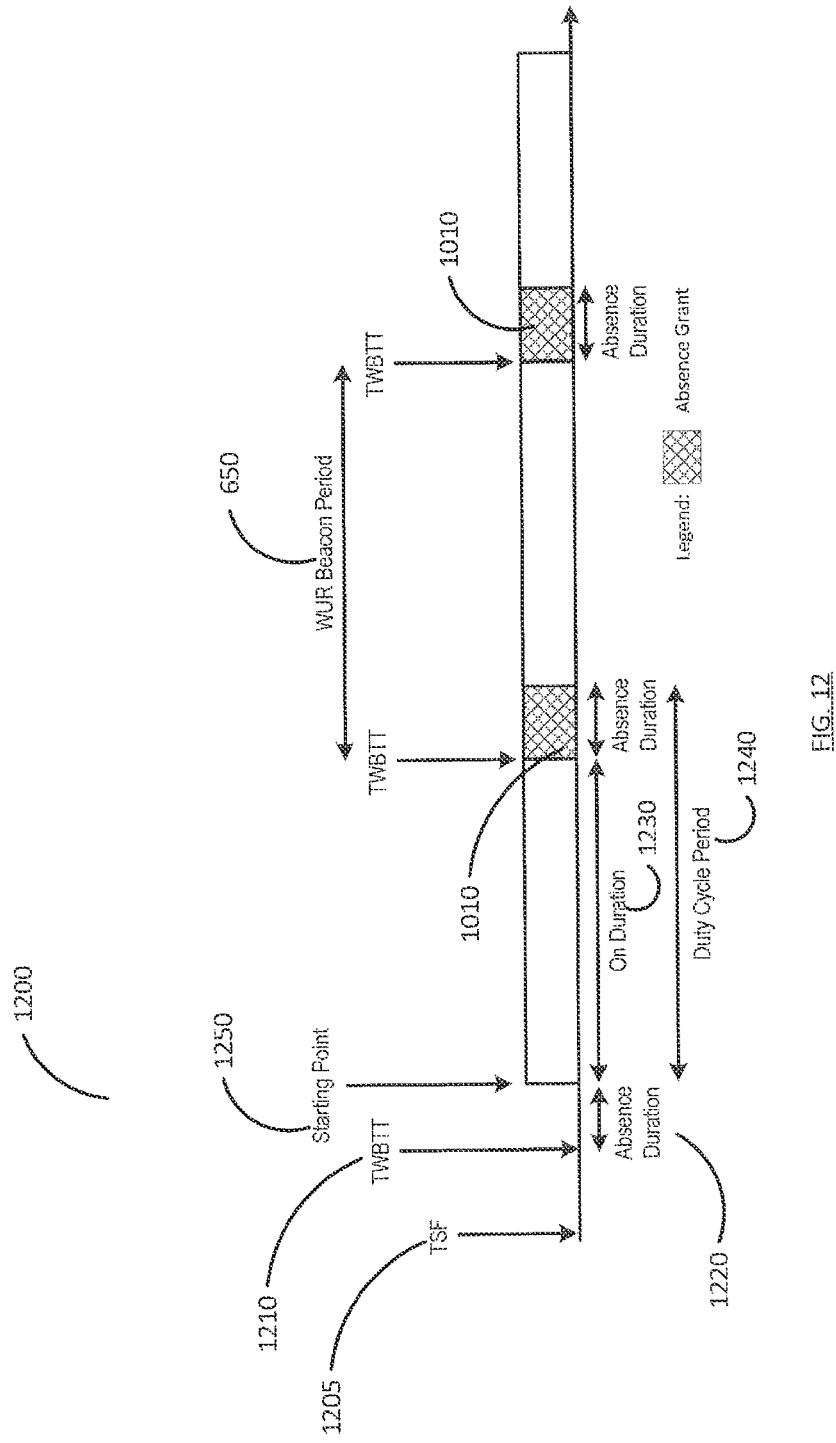
FIG. 12 shows an alternative scheme for the WUR duty cycle operation as per a second embodiment.

FIG. 12 illustrates an alternative method 1200 of Duty Cycle Operation in the presence of Absence Grants. Instead of advertising the Absence Duration using the WUR Operation element 600, as per the second embodiment, the AP indicates the Absence Duration implicitly during the WUR Mode setup negotiation 500 using the Starting Point 1250. At this point it has to be noted that the size of the Starting Time of the WUR Duty Cycle field 750 in the WUR mode element 700 carried in the WUR Mode setup frame 510 may be less than 8 octets, for example only 5 octets. Since an AP uses 8 octets long TSF to maintain the system timing in an 802.11 BSS, this means that the Starting Point 1250 may not be directly indicated by the Starting Time of the WUR Duty Cycle field 750, especially when the value of the current timestamp, and hence the intended Starting Point requires more than 5 octets to signal. In such a case, the AP may instead signal the starting time of any of the previous On Durations that can be signaled using 5 octets, for example the very first On Duration 430 closest in time to TSF 0. Since the Duty Cycle is periodic by nature and the On Duration 430 repeats once every Duty Cycle Period 420, if the value of the current timestamp when the WUR Mode setup frame 510 is received has crossed the 5 octets mark, based on the Starting Point indicated by the Starting Time of the WUR Duty Cycle field 750, a WUR STA needs to calculate the intended Starting Point 1250 as being the next Starting Point closest in time to the current TSF 1205. In FIG. 12, the Starting Point 1250 then represents the intended starting time of the first On Duration 1230 for a WUR STA's WUR mode operation. The AP may choose the Starting Point 1250 in such a way that the time difference between the Starting point 1250 and the immediately preceding TWBTT 1210 represents the Absence Duration 1220. This not only saves signaling resources, but also allows the AP to individually customize the Absence Duration for different WUR STAs, for example taking in account the differences in the Channel Switch Margins etc.

In addition, for a more efficient management of Duty Cycle Operation in the presence of Absence Grants, especially with regards to Always On WUR STAs, the On Duration and Duty Cycle Period may be adjusted during the WUR Mode setup negotiation 500. Regardless of the value of the On Duration field 770 and the Duty Cycle Period field 780 requested by an Always On WUR STA in the WUR Mode Setup frame 510, when the AP assigns the WUR STA to a WUR channel other than the WUR Primary channel, it may treat the WUR STA as a Duty Cycled WUR STA by re-adjusting the Duty Cycle Period 1240 as being equal to the WUR Beacon Period 650, while the On Duration 1230 is re-adjusted as the difference between the Duty Cycle Period 1240 and the Absence Duration 1220. Such a WUR STA may be referred to as operating in a Pseudo Duty Cycle Operation. Since the Absence Grant 1010 lies outside the adjusted On Duration 1230, during this time the WUR STA may switch its WURx to the WUR Primary channel to receive WUR Beacon frames in the same manner as a normal Duty Cycled WUR STA. Since an AP does not transmit WUR frames to a WUR STA outside its On Duration, by treating the WUR STA as a Duty Cycled WUR STA operating in a Pseudo Duty Cycle Operation, the AP need not manage the Absence Grants separately. An Always On WUR STA, if assigned to a WUR channel other than the WUR Primary channel, may also consider itself as a Duty Cycled WUR STA operating in a Pseudo Duty Cycle Operation.

Figure 13:
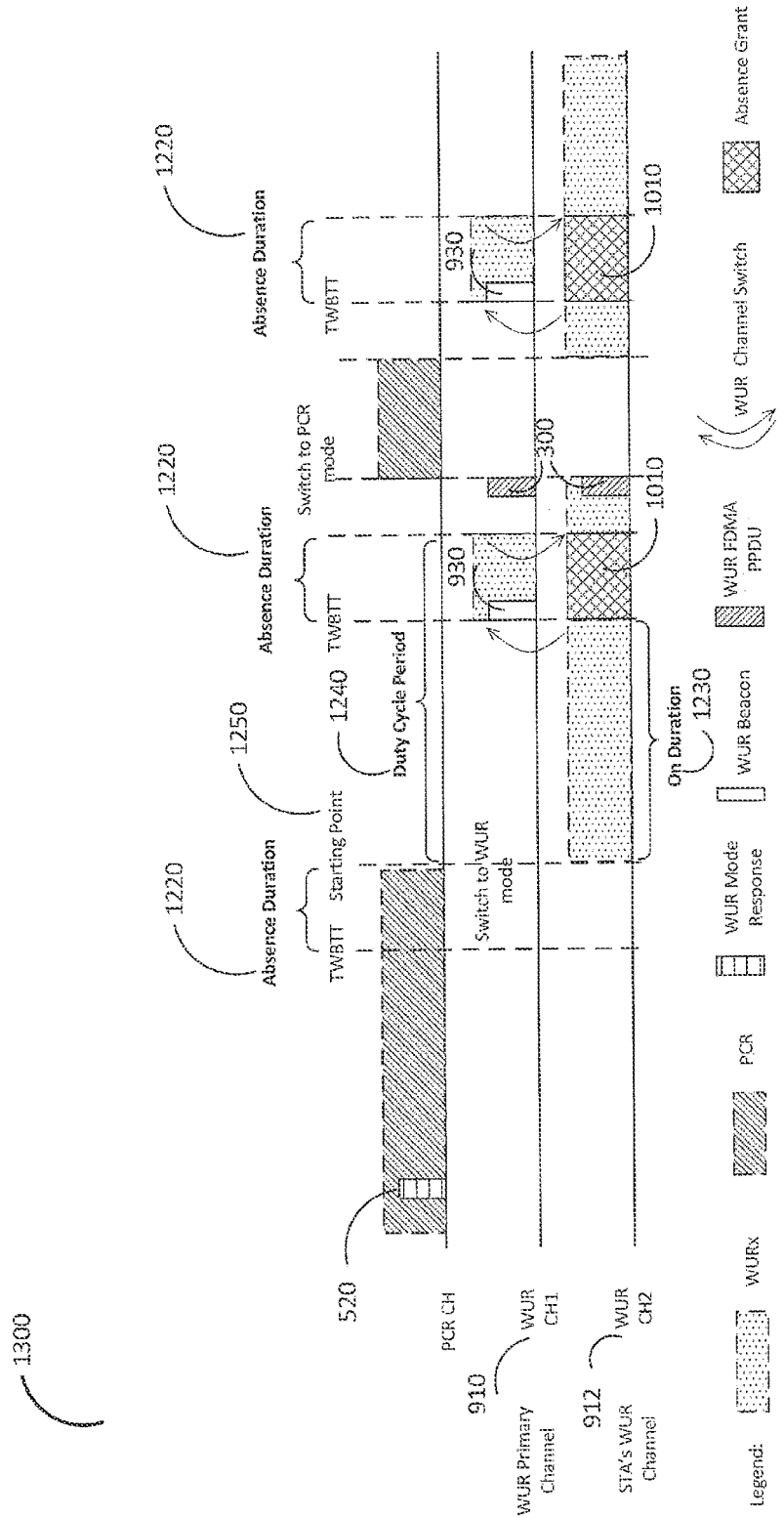
FIG. 13 shows an example frame transmission sequence between a WUR AP and a WUR STA operating in the WUR duty cycle operation as per the second embodiment.

Referring to FIG. 13, an example transmission sequence 1300 is shown to illustrate the alternate method 1200 for the special case of an Always On WUR STA 150 that is treated as a Duty Cycled WUR STA operating in a Pseudo Duty Cycle Operation. The WUR STA 150 initiates the WUR mode setup by transmitting the WUR Mode setup frame 510 to AP 110 in which the On Duration field 770 is set equal or larger in length than the Duty Cycle Period field 780 to signal its intention to operate as an Always On WUR STA. If the AP 110 accepts the WUR mode setup request, it transmits the WUR Mode setup frame 520 to the WUR STA with the WUR Mode Response Status field 720 set to Accept. The AP 110 also sets the WUR Channel Offset 740 to assign the WUR STA 150 to WUR CH2 912, while the Starting Time Of The WUR Duty Cycle field 750 is set to indicate the Starting Point 1250 as well as to implicitly signal the Absence Duration 1220. The AP 110 treats the WUR STA 150 as a Duty Cycled WUR STA operating in a Pseudo Duty Cycle Operation with effective On Duration 1230 and effective Duty Cycle Period 1240. Upon receiving and acknowledging the frame 520, the WUR STA 150 may also consider itself as a Duty Cycled WUR STA operating in a Pseudo Duty Cycle Operation with effective On Duration 1230 and effective Duty Cycle Period 1240. The WUR STA 150 may switch to the WUR mode at time 1250 by putting its PCR in the doze state. At the same time it also turns on its WURx and tunes it to the assigned WUR CH2 912 such that it is ready to receive WUR frames from AP 110 by the Starting Point 1250. In this example, an Absence Grant 1010 starts at each TWBTT, the time duration of each Absence Grant being equal to the value indicated by the Absence Duration field 1220. During the Absence Grant 1010, the WUR STA 150 may choose to switch to the WUR Primary channel to receive the WUR Beacon 930 at the TWBTTs.

Third Embodiment

Figure 14:
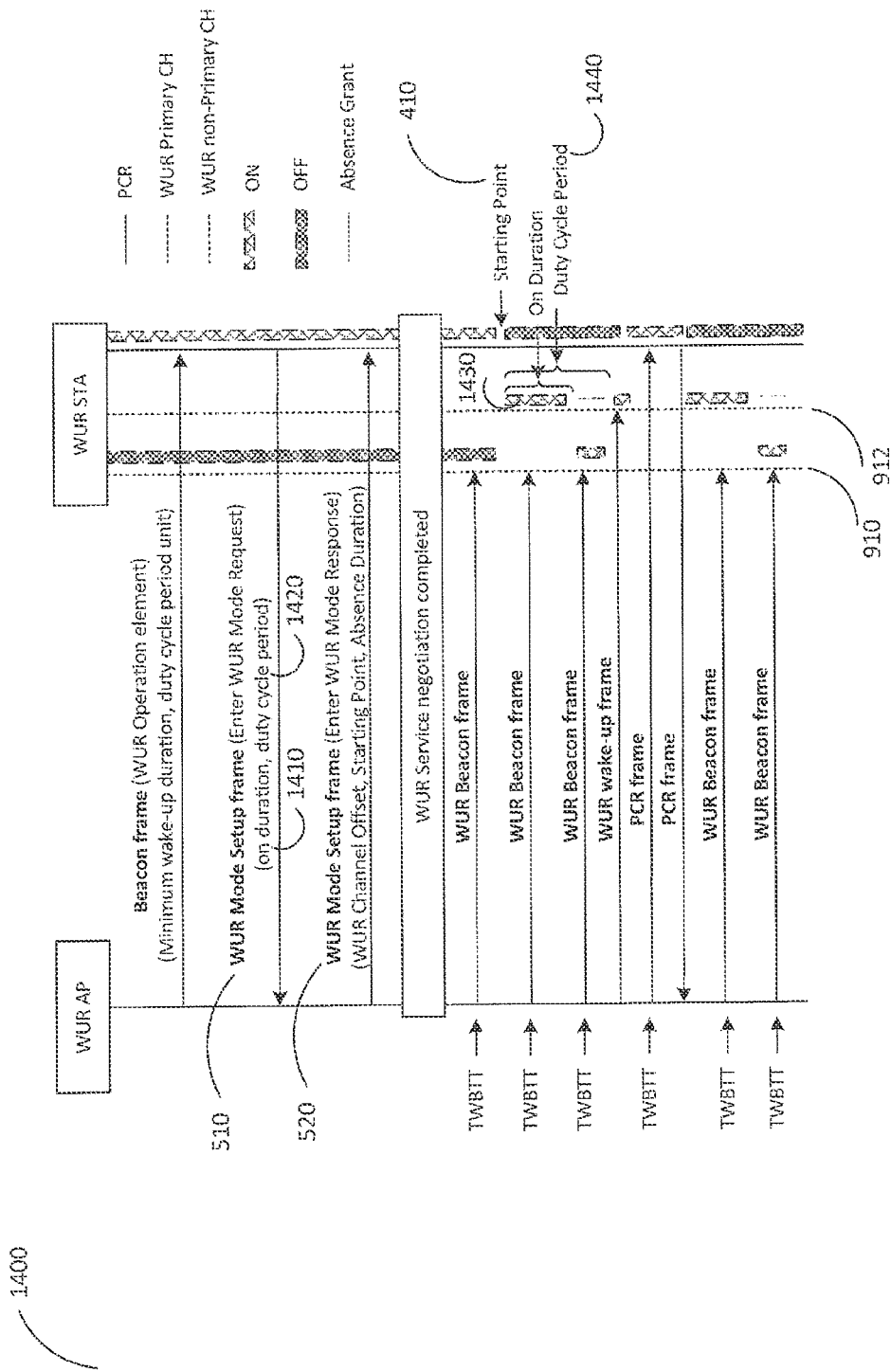
FIG. 14 shows the frame exchange sequence involved in the WUR Mode setup negotiation as per a third embodiment.

As mentioned earlier, a WUR STA, depending on its clock accuracy and synchronization requirements, may not need to receive the WUR Beacon at every TWBTT and may only choose to switch to the WUR Primary channel to receive the WUR Beacon at some of the TWBTTs. This means that the Absence Grants need not be provided at every TWBTT. Referring to FIG. 14, an alternate frame exchange sequence 1400 for WUR Mode setup negotiation is illustrated. Based on its clock accuracy and synchronization requirements, in the WUR Mode Setup frame 510, the WUR STA sets the Duty Cycle Period field 780 to indicate a Duty Cycle Period 1420 that is as close as possible to the periodicity at which it intends to switch channels to receive WUR Beacons. If possible this value should be integer multiples of the WUR Beacon Period advertised by the AP. However, due to the difference in the units, the indicated Duty Cycle Period 1420 may not be an exact integer multiple of the WUR Beacon Period. The WUR STA also set the value of the On Duration field 770 to indicate an On Duration 1410 that is equal to larger than the Duty Cycle Period 1420 to signal its intention to operate as an Always On WUR STA. If the AP assigns the WUR STA to a WUR channel other than the WUR Primary channel, it may treat the WUR STA as a Duty Cycled WUR STA operating in Pseudo Duty Cycle Operation by re-adjusting the Duty Cycle Period 1440 as being equal to the largest value that is an integer multiple of the WUR Beacon Period 650 and equal or smaller than the requested Duty Cycle Period 1420, while the On Duration 1430 is re-adjusted as the difference between the Duty Cycle Period 1440 and the Absence Duration indicated by the Absence Duration field 760 in the WUR Mode Setup frame 520. An Always On WUR STA, if assigned to a WUR channel other than the WUR Primary channel, also consider itself as a Duty Cycled WUR STA operating in a Pseudo Duty Cycle Operation and adopt the effective On Duration 1430 and the effective Duty Cycle Period 1440.

Figure 15:
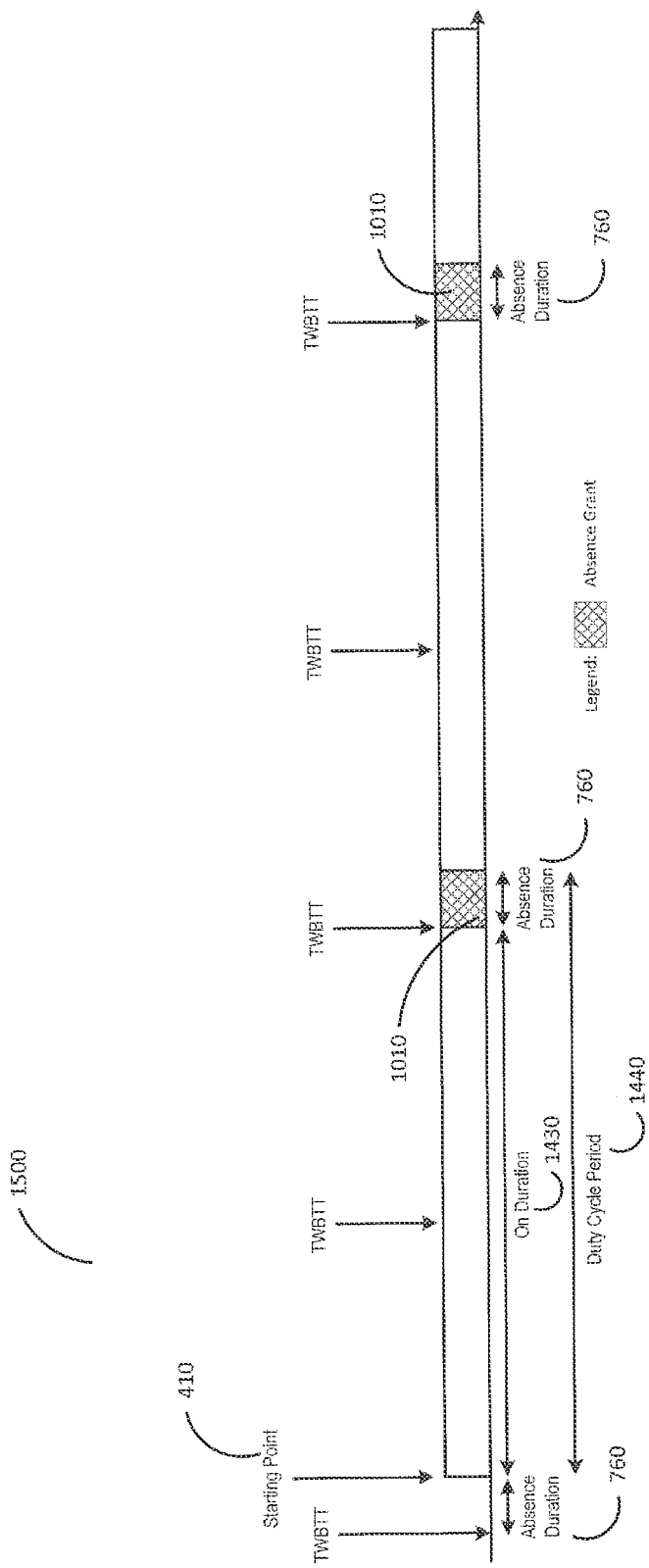
FIG. 15 shows an alternative scheme for the WUR duty cycle operation as per the third embodiment.
Figure 16:
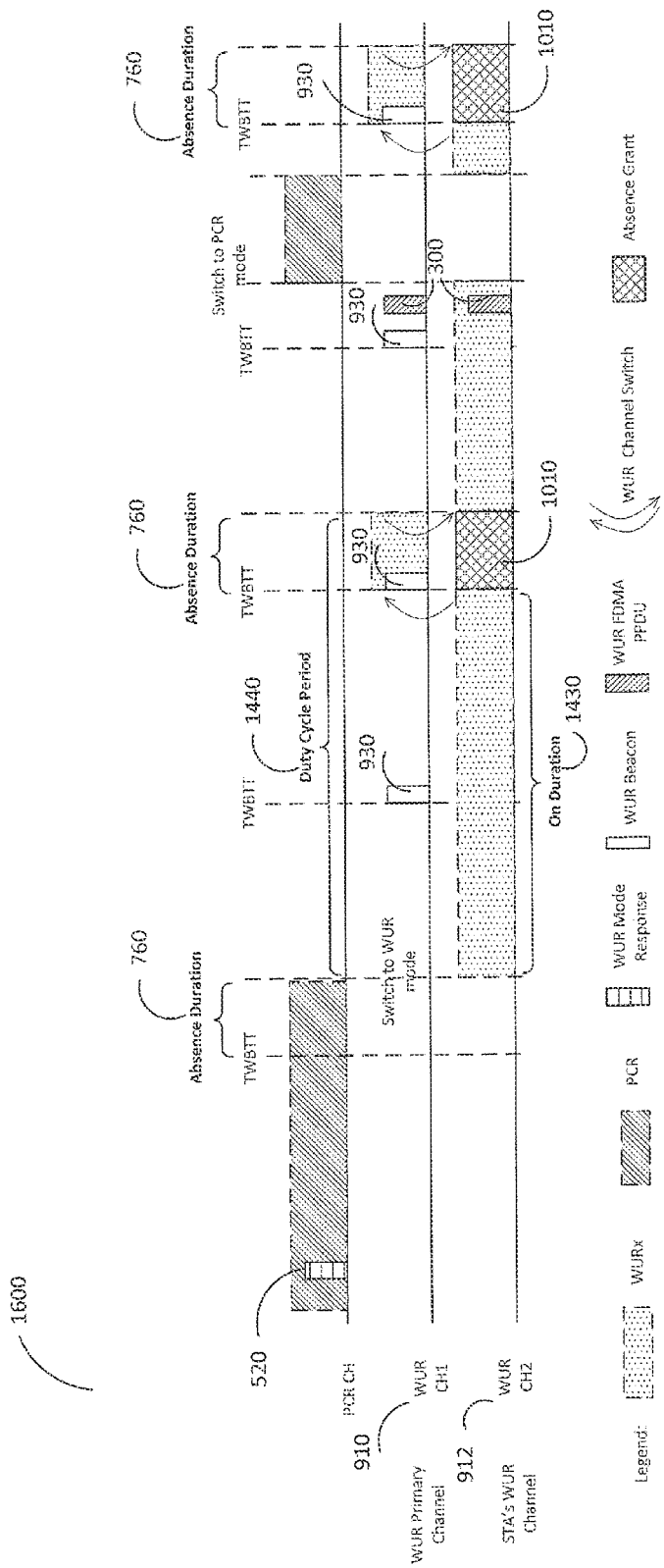
FIG. 16 shows an example frame transmission sequence between a WUR AP and a WUR STA operating in the WUR duty cycle operation as per the third embodiment.

The alternate Pseudo Duty Cycle Operation 1500 as per the third embodiment is shown in FIG. 15. The AP 110 indicates the intended Starting Point 410 as the nearest TWBTT plus the Absence Duration 760 indicated in the WUR Mode Setup frame 520. In this example the WUR STA 150 requests the Duty Cycle Period 1440 as twice the WUR Beacon Period. The On Duration 1430 is re-adjusted as the difference between the Duty Cycle Period 1440 and the Absence Duration 760. This allows the WUR STA to control how often the Absence Grants occur and allows it to skip performing channel switch at TWBTTs at which it does not intend to receive WUR Beacon frames. Referring to FIG. 16, an example transmission sequence 1600 is shown to illustrate the alternate method 1500 for the special case of an Always On WUR STA 150 that is treated as a Duty Cycled WUR STA operating in a Pseudo Duty Cycle Operation. The WUR STA 150 initiates the WUR mode setup by transmitting the WUR Mode setup frame 510 to AP 110 in which Duty Cycle Period field 780 is set as twice the WUR Beacon Period and the On Duration field 770 is set equal or larger in length than the Duty Cycle Period field 780 to signal its intention to operate as an Always On WUR STA. If the AP 110 accepts the WUR mode setup request, it transmits the WUR Mode setup frame 520 to the WUR STA with the WUR Mode Response Status field 720 set to Accept. The AP 110 also sets the WUR Channel Offset 740 to assign the WUR STA 150 to WUR CH2 912, and the Absence Duration field 760 to indicate the duration of the Absence Grants. The AP 110 treats the WUR STA 150 as a Duty Cycled WUR STA operating in a Pseudo Duty Cycle Operation with effective On Duration 1430 and effective Duty Cycle Period 1440 (in this case same as the requested value of twice the WUR Beacon Period). Upon receiving and acknowledging the frame 520, the WUR STA 150 may also consider itself as a Duty Cycled WUR STA operating in a Pseudo Duty Cycle Operation with effective On Duration 1430 and effective Duty Cycle Period 1440. In this example, an Absence Grant 1010 starts at alternate TWBTTs, the time duration of each Absence Grant being equal to the value indicated by the Absence Duration field 760. During the Absence Grant 1010, the WUR STA 150 may choose to switch to the WUR Primary channel to receive the WUR Beacon 930 at the TWBTTs.

Figure 17:
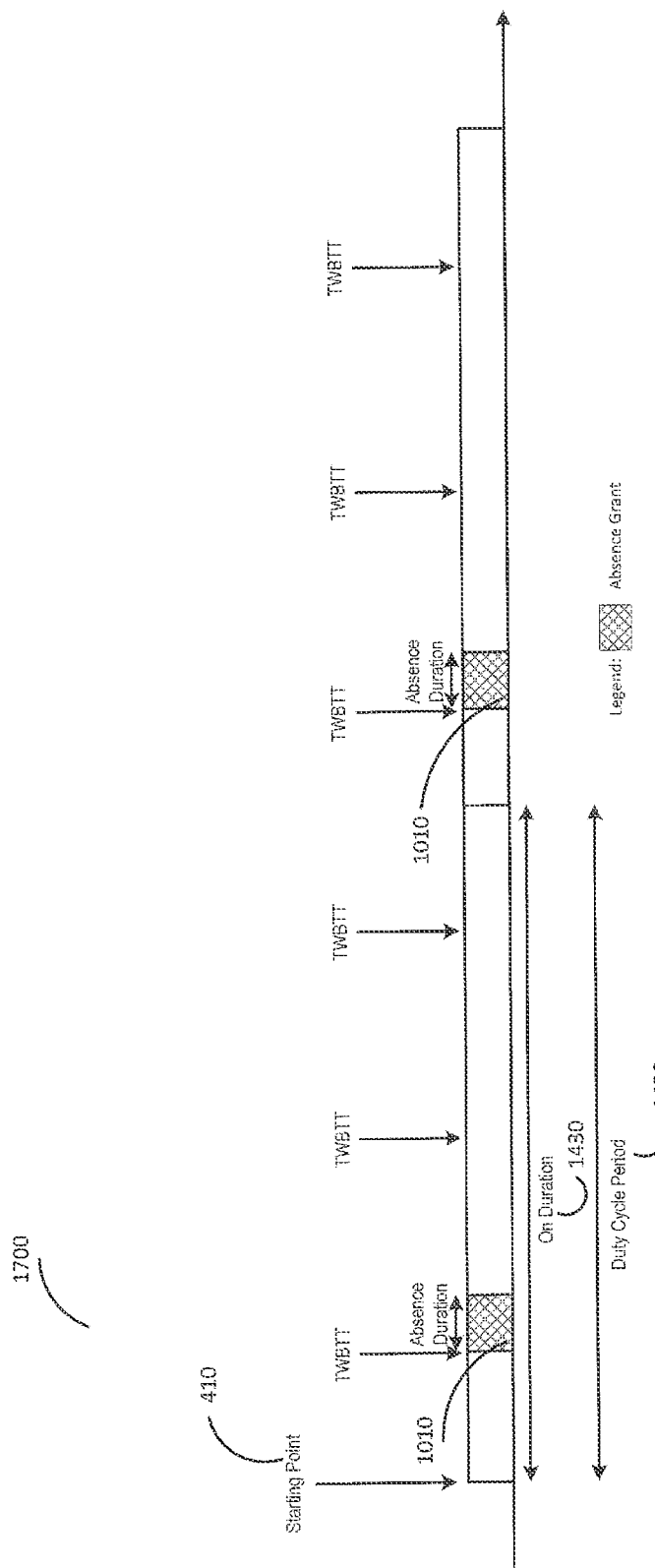
FIG. 17 shows yet another alternative scheme for the WUR duty cycle operation as per the third embodiment.

Although operating as Pseudo Duty Cycle Operation would allow an Always On WUR STA to be treated as a Duty Cycle WUR STA, this may not be always possible or supported. Referring to FIG. 17, an alternate Duty Cycle Operation 1700 as per the third embodiment for the special case of an Always On WUR STA is illustrated. Here, an Absence Grant is defined to start at the first TWBTT that occurs during a Duty Cycle Period 1420 and not at any other TWBTTs during the Duty Cycle Period. Since an Absence Grant represents a time period in which the AP is not able to communicate with the WUR STA on its assigned WUR Channel, by adjusting the value of the Duty Cycle Period 1420 that it requests during the WUR Mode setup negotiation, a WUR STA can customize how often the Absence Grant occurs and thus further minimize the disruption to its WUR service. If the WUR STA intends to receive WUR Beacon frames at every TWBTT (for example if the WUR Beacon Period is very long), the WUR STA can set the Duty Cycle Period field 780 in the WUR Mode setup frame 510 to value equal or slightly larger than one WUR Beacon Period. However if it only intends to receive WUR Beacon frames once every ten TWBTTs (for example if the WUR Beacon Period is very short), the WUR STA can set the Duty Cycle Period field 780 in the WUR Mode setup frame 510 to a value equal or slightly larger than ten WUR Beacon Periods. In some BSS, however, it may not be possible for a WUR STA to accurately convey its desired periodicity of the Absence Grants by tuning the Duty Cycle Period alone. For example if the AP has set the Duty Cycle Period Units field 620 to the largest possible value (e.g. $2^{18}$ microsecond—262 ms) and assuming the WUR Beacon Period is small (e.g. 0-10 ms), an Absence Grant only occurs once every 26 TWBTTs. As such, the WUR STA may also indicate its desired periodicity for the Absence Grants in the Absence Grant Periodicity field 790 in the WUR Mode element 700 that it includes in the WUR Mode Setup frame 520. The Absence Grant Periodicity field 790 indicates the number of TWBTTs to be skipped in between two consecutive Absence Grants, for example 0 indicates that an Absence Grant starts at each TWBTT, 1 indicates that an Absence Grant starts at alternate TWBTTs, 2 indicates that an Absence Grant occurs once every three TWBTTs and so on. This allows the WUR STA to have a finer control over its desired periodicity of the Absence Grants.

Fourth Embodiment

Figure 18:
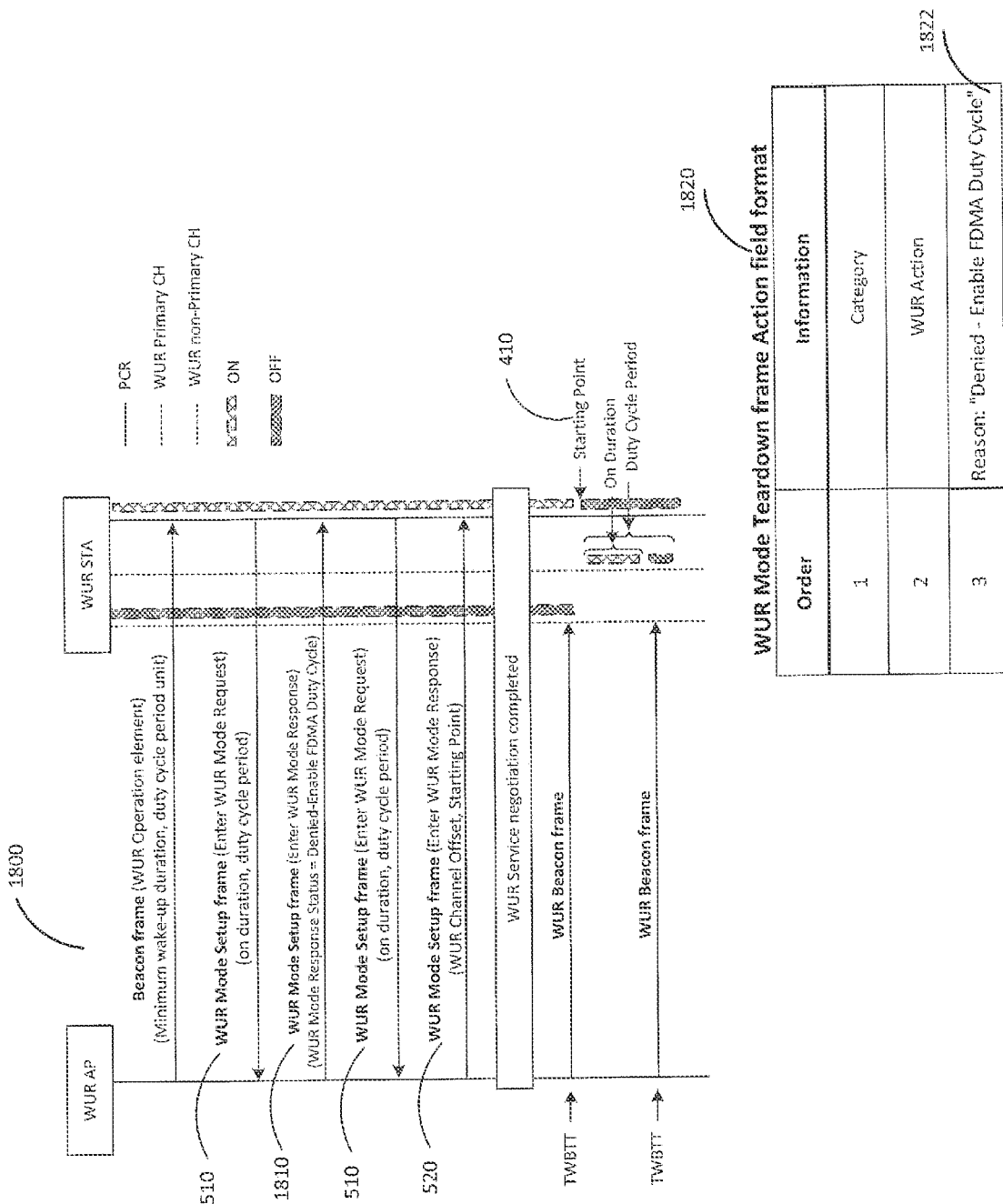
FIG. 18 shows the frame exchange sequence involved in the WUR Mode setup negotiation as well as the frame format of the WUR Mode Teardown Action frame as per a fourth embodiment.

Referring to FIG. 18, an alternative method 1800 of avoiding the disruption in WUR service due to WUR channel switching during an On Duration 430 is illustrated. As mentioned earlier, a WUR STA is expected to have its WURx in the awake state during the entire duration of the On Duration 430, and due to the uncertainties that exist in the time duration that an Always On WUR STA's WURx may be unavailable on its assigned WUR channel due to WUR channel switching to receive WUR Beacon frames, an AP may choose to assign all Always On WUR STA to the WUR Primary channel. Alternatively, the AP may also force the WUR STA to re-negotiate the WUR mode setup as a Duty Cycled WUR STA with a duty cycle ratio less than 1. This is illustrated in the frame exchange sequence 1800. A WUR STA initially initiates the negotiation of WUR service setup by transmitting to the WUR AP, the WUR Mode Setup frame 510 that carries the WUR Mode element 700 in which the On Duration 770 is set to a value equal or larger in length to the Duty Cycle Period 780 to signal its intention to operate as an Always On WUR STA. If the AP intends to assign the WUR STA to a WUR channel other than the WUR Primary channel, the AP may reject the WUR Mode setup request and explicitly signal its intention to assign the WUR STA to a WUR channel other than the WUR Primary channel by transmitting the WUR Mode Setup frame 1810 in which the WUR Mode Response Status 720 is set to "Denied—Enable FDMA Duty Cycle" 724. Alternatively, the AP may also signal the intention implicitly by transmit the WUR Mode Setup frame 520 in which the WUR Mode Response Status 720 is set to "Denied" 726 while the WUR Channel Offset field 740 is set to a value that indicates a WUR channel other than the WUR Primary channel. Here, it is assumed that the WUR STA is capable of operating in Duty Cycle Operation and has indicated the capability, for example by setting the Duty Cycle Support field 830. Although not shown in the frame exchange sequence 1800, it is also possible that the AP may choose to force the re-negotiation during an existing WUR service (i.e. the WUR STA has already successfully completed WUR Mode setup negotiation). The AP may do so by transmitting the WUR Mode Teardown Action frame 1820 in which the Reason field 1822 is set to "Denied—Enable FDMA Duty Cycle". When a WUR STA receives a frame with either the Status field or the Reason field set to "Denied—Enable FDMA Duty Cycle", or the Status field set to "Denied" 726 while the WUR Channel Offset field 740 is set to a value that indicates a WUR channel other than the WUR Primary channel, the WUR STA is informed of the AP's intention to assign it to a WUR channel other than the WUR Primary channel. The WUR STA may then retransmit the WUR Mode Setup frame 510 to the AP in which the On Duration 770 is set to a value smaller in length than the Duty Cycle Period 780 such that the On Duration 430 does not overlap any TWBTTs. If the AP accepts the WUR STA's request to operate in Duty Cycle Operation, it transmits the WUR Mode Setup frame 520 to the WUR STA to inform it of the assigned WUR channel as well as the Starting Point 410 of the first On Duration 430. At the indicated Starting Point 410, the WUR STA may transition to the Duty Cycled WUR Mode on its assigned WUR channel.

Configuration of an Access Point

Figure 19:
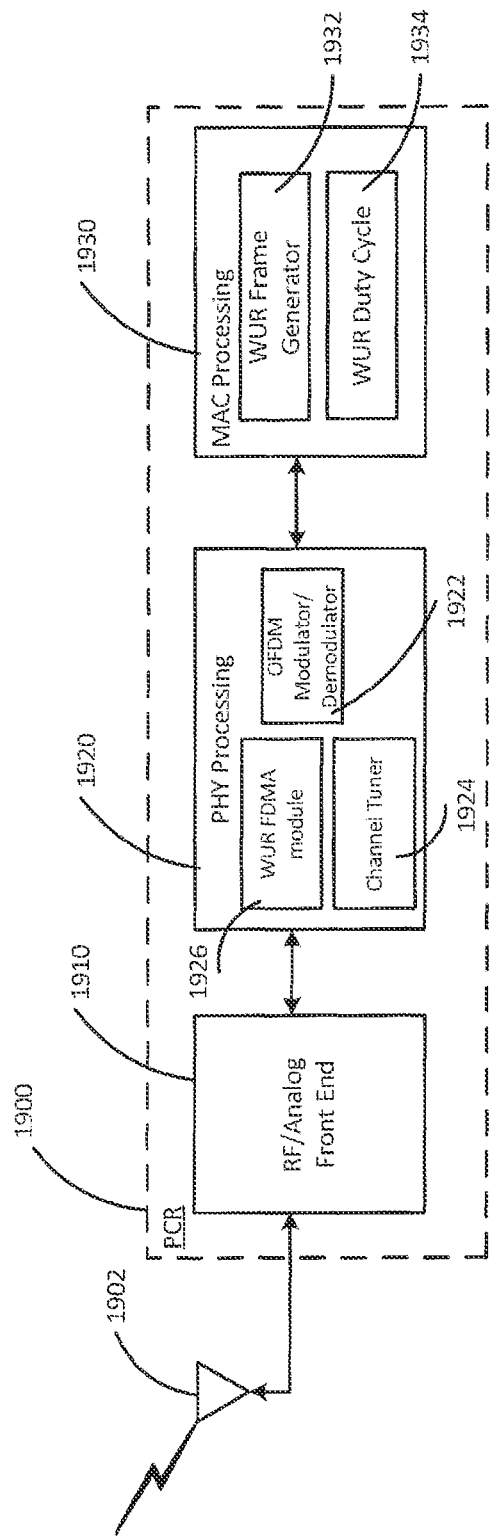
FIG. 19 is a simplified block diagram of an example AP that implements the disclosed scheme.

FIG. 19 is a block diagram of the PCR 1900 of an example AP that implements the Duty Cycle schemes described in the present disclosure. The AP may be the AP 110 in FIG. 1 (The PCR 1900 may be the PCR 112 in FIG. 1). The PCR 1900 is connected to the antenna 1902, and is used for the transmission and reception of 802.11 signals as well as for the transmission of WUR PPDUs. PCR 1900 is comprised of an RF/Analog front end 1910, PHY processing circuitry 1920 and MAC processing circuitry 1930.

The RF/Analog front end 1910 is responsible for transfer of analog signals to/from the antenna 1902 and may comprise sub-components such as Automatic Gain Control (AGC), Low Pass Filter (LPF), Analog-to-Digital Converter (ADC) and so on.

The PHY Processing circuitry 1920 is responsible for the processing of the PHY layer signals and is further comprised of an OFDM modulator/demodulator 1922, a Channel Tuner 1924 and a WUR FDMA module 1926. The OFDM modulator/demodulator 1922 is responsible for the OFDM modulation of transmit signals or demodulation of received OFDM signals. On the transmission side, aside from applying OFDM modulation to 802.11 PPDUs, the OFDM modulator/demodulator 1922 is also used to generate WUR signal (e.g. OOK) by populating selected OFDM subcarriers. The Channel Tuner 1924 is used to set the transmission frequency to the correct channel for transmissions or reception, for example to the PCR channel for transmission or reception of PCR signals, or to the correct WUR Operational Channel for transmission of WUR PPDUS. The WUR FDMA module 1926 is present if the AP is capable of FDMA transmissions and is used for multiplexing of WUR signals when FDMA transmission is used and also to decide the WUR channel assignments of associated WUR STAs.

The MAC Processing circuitry 1930 is responsible for various MAC related processing such as retransmission, fragmentation, aggregation etcetera and is further comprised of a WUR Frame Generator 1932 and a WUR Duty Cycle module 1934. The WUR Frame Generator/Scheduler 1932 is responsible for generating the WUR Frames carried in WUR PPDUs transmitted by the AP and to schedule them for transmission at the correct time. The WUR Duty Cycle module 1934 is responsible for managing the Duty Cycle schedules and parameters of associated WUR STAs. The WUR Duty Cycle module 1934 is also responsible for scheduling Absence Grants and calculating/signaling Absence Durations.

Figure 20:
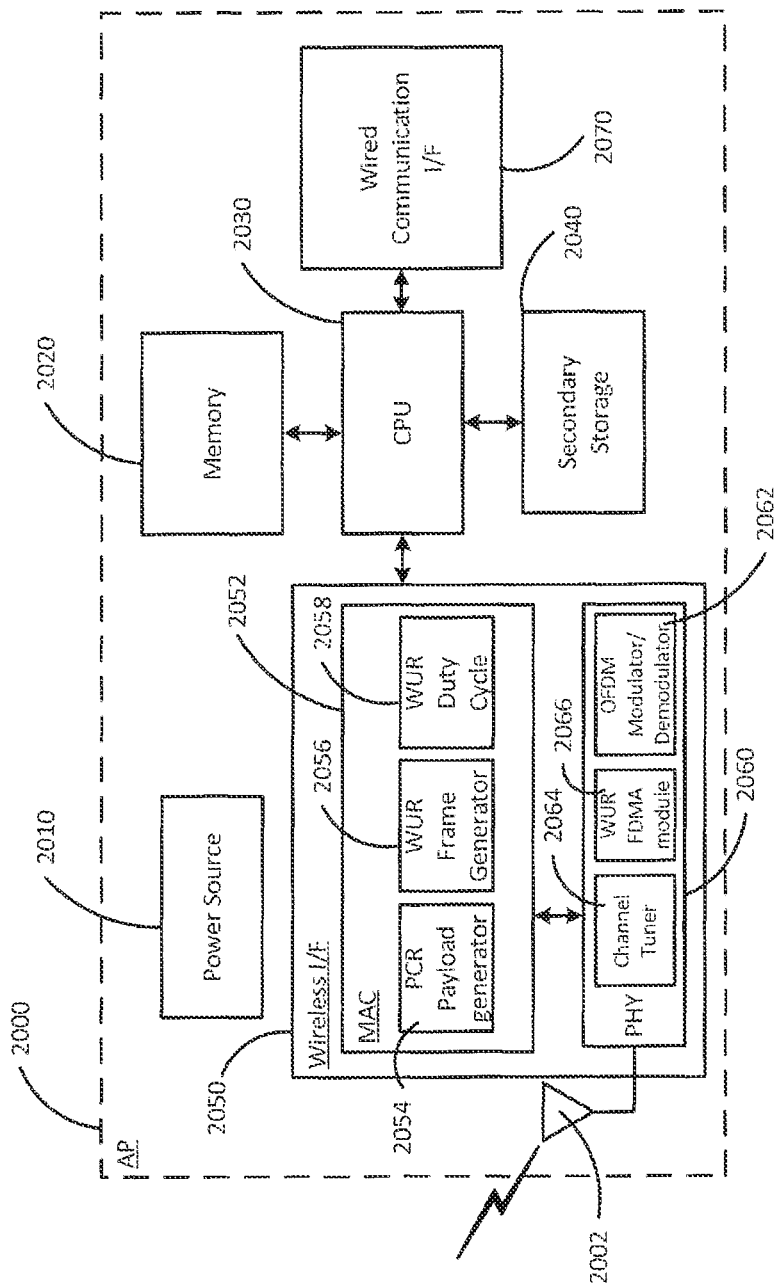
FIG. 20 is a detailed block diagram of an example AP that implements the disclosed scheme.

FIG. 20 is a more detailed block diagram of an example AP 2000, which may be the AP 110 in FIG. 1. The AP 2000 comprises a Central Processing Unit (CPU) 2030 coupled to a memory 2020, a secondary storage 2040, one or more wireless communication interfaces 2050, as well as other wired communication interfaces 2070. The secondary storage 2040 may be a non-volatile computer readable storage medium that is used to permanently store pertinent instruction codes, data etc.

At the time of start up, the CPU 2030 may copy the instruction codes as well as related data to the volatile memory 2020 for execution. The instruction code may be an operating system, user applications, device drivers, execution codes etc. which are required for the operation of the AP 2000. The size of the instruction code and hence the storage capacity of both the secondary storage 2040 as well as the memory 2020 may be substantially bigger than that of the STA 2200 in FIG. 22.

The AP 2000 may also comprise a power source 2010 which in most cases may be a power mains but in some cases may also be some kind of high capacity battery for e.g. a car battery. The wired communication interface 2070 may be an ethernet interface, or a powerline interface, or a telephone line interface etc.

The wireless communication interface 2050 may comprise an interface for cellular communication, or an interface for short range communication protocols such as Zigbee, or it may be a WLAN interface. The Wireless interface 2050 may further comprise a MAC module 2052 and a PHY module 2060. The MAC module 2052 of an AP may be substantially more complicated than that of a STA 2200 in FIG. 22 and may comprise many sub-modules. Among other sub-modules, the MAC module 2052 may be comprised of a WUR Frame Generator 2056, a PCR payload generator 2054 and a WUR Duty Cycle module 2058. The PHY module 2060 is responsible for the conversion of the MAC module data to/from the transmission/reception signals and is further comprised of an OFDM modulator/demodulator 2062, a Channel Tuner 2064 and a WUR FDMA module 2066. The wireless interface may also be coupled, via the PHY module, to one or more antennas 2002 that are responsible for the actual transmission/reception of the wireless communication signals on/from the wireless medium.

An AP as per the present disclosure may comprise many other components that are not illustrated, for sake of clarity, in FIG. 20. Only those components that are most pertinent to the present disclosure are illustrated.

Configuration of a STA

Figure 21:
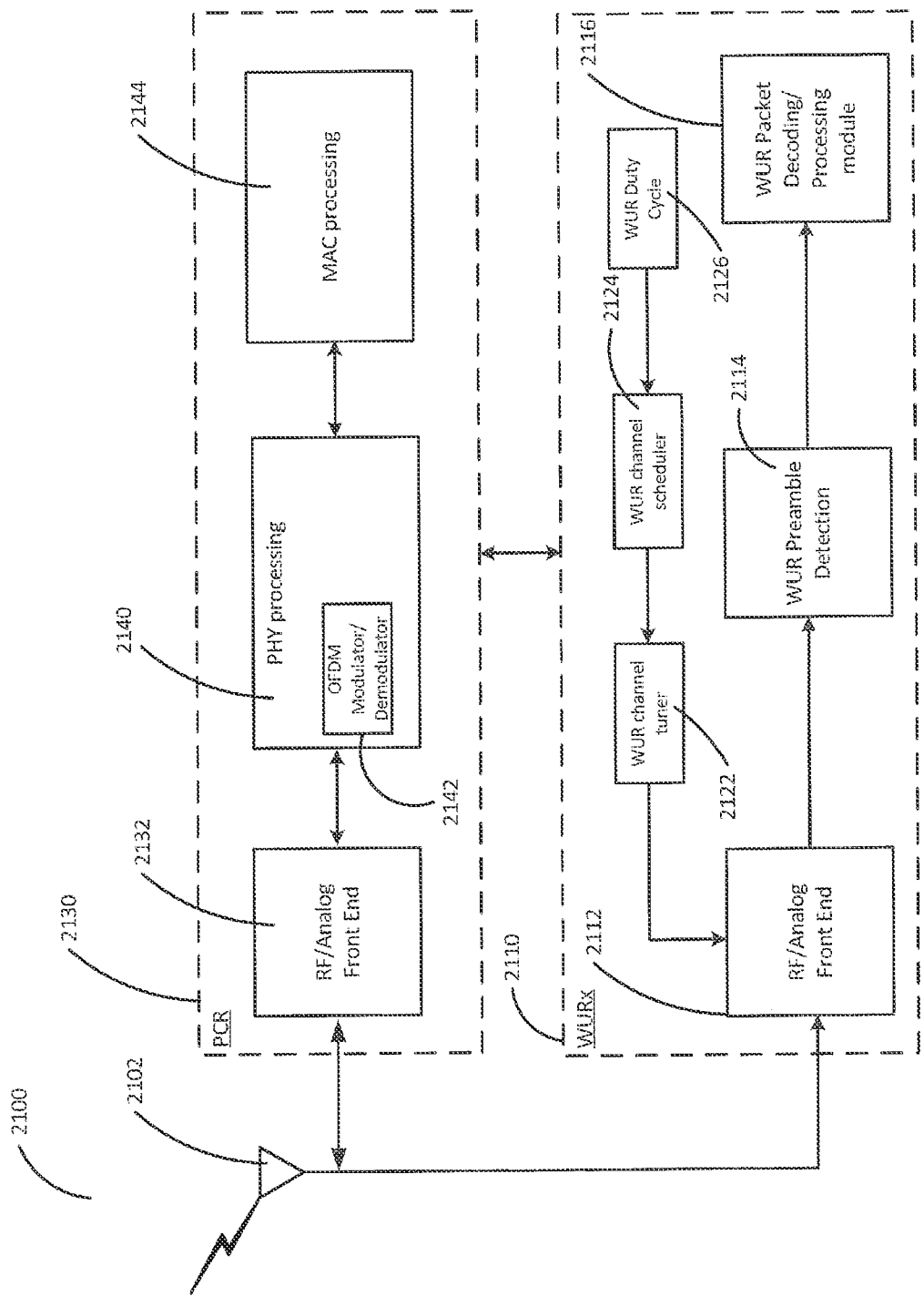
FIG. 21 is a simplified block diagram of an example WUR STA that implements the disclosed scheme.

FIG. 21 illustrates a WUR STA 2100 that is equipped with two separate radios: a PCR 2130 for transmitting and receiving 802.11 OFDM signals and a WURx 2110 for receiving WUR PPDUs. Both the PCR 2130 and the WURx 2110 may be connected to the same antenna 2102, or they may also be connected to different antennas.

The WURx 2110 is further comprised of several sub components such as an RF/Analog Front End 2112 responsible for receiving the analog radio signals from the antenna 2102, a WUR Preamble Detection module 2114 responsible for detecting and decoding the preamble portion of the WUR PPDUs, a WUR Packet Decoding/Processing module 2116 responsible for decoding and processing the payload portion of the wakeup signal, a WUR channel tuner 2122 responsible for tuning the WURx to the correct WUR channel, a WUR channel scheduler 2124 which is responsible for correctly scheduling the WUR channel tuner 2122 for reception of broadcast WUR frames and a WUR Duty Cycle module 2126 that is responsible for managing the Duty Cycle schedules and parameters. The WUR Duty Cycle module 2126 is also responsible for keeping track of Absence Grants and initiating WUR channel switches during the Absence Grants.

The PCR 2130 is comprised of an RF/Analog front end 2132, a PHY processing circuitry 2140 and a MAC processing circuitry 2144. The RF/Analog front end 2132 is responsible for transfer of analog signals to/from the antenna 2102 and may comprise sub-components such as Automatic Gain Control (AGC), Low Pass Filter (LPF), Analog-to-Digital Converter (ADC) and so on. The PHY Processing circuitry 2140 is responsible for the processing of the PHY layer signals and is further comprised of an OFDM modulator/demodulator 2142 that is responsible for the modulation of transmit OFDM signals or demodulation of received OFDM signals.

Figure 22:
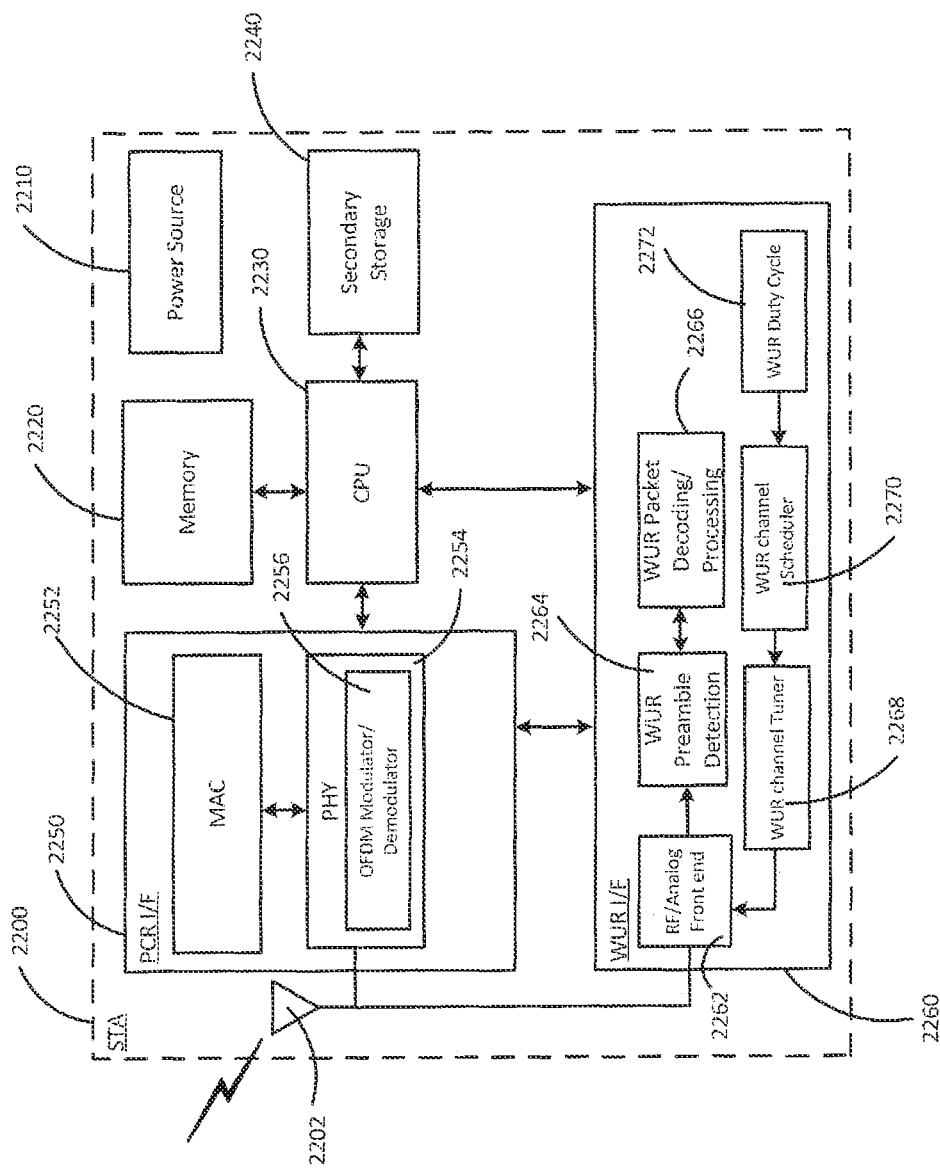
FIG. 22 is a detailed block diagram of an example WUR STA that implements the disclosed scheme.

FIG. 22 is a detailed block diagram of an example STA 2200 that may be any of WUR STA 130, WUR STA 140, WUR STA 150 or WUR STA 160 in FIG. 1. The STA 2200 is comprised of a Central Processing Unit (CPU) 2230 coupled to a memory 2220, a secondary storage 2240, a PCR interfaces 2250 as well a WUR interface 2260. Both the PCR interface 2250 and the WUR interface 2260 are connected to the same wireless antenna 2202, or they may also be connected to different antennas. The secondary storage 2240 may be a non-volatile computer readable storage medium that is used to permanently store pertinent instruction codes, data etc.

At the time of start up, the CPU 2230 may copy the instruction codes as well as related data to the volatile memory 2220 for execution. The instruction code may be an operating system, user applications, device drivers, execution codes etc. which are required for the operation of the STA 2200. The STA 2200 may also comprise a power source 2210, for example a lithium ion battery or a coin cell battery etc. or it may also be Mains electricity. The PCR interface 2250 may comprise an interface for cellular communication, or an interface for short range communication protocols such as Zigbee, or it may be a WLAN interface.

The PCR interface 2250 is comprised of a MAC module 2252 and a PHY module 2254 which is further comprised of an OFDM Modulator/Demodulator 2256.

The WUR interface 2260 is comprised of several sub components such as an RF/Analog Front End 2262 responsible for receiving the analog radio signals from the antenna 2202, a WUR Preamble Detection module 2264 responsible for detecting and decoding the preamble portion of the wake up signal, a WUR Packet Decoding/Processing module 2266 responsible for decoding and processing the payload portion of the wakeup signal, a WUR channel tuner 2268 responsible for tuning the WUR interface to the correct WUR channel, a WUR channel scheduler 2270 which is responsible for correctly scheduling the WUR channel tuner 2268 for reception of broadcast WUR frames and a WUR Duty Cycle module 2272 responsible for keeping track of Duty Cycle schedules, Absence Grants and initiating WUR channel switches during the Absence Grants.

A WUR STA as per the present disclosure may comprise many other components that are not illustrated, for sake of clarity, in FIG. 21 or FIG. 22. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

Should a circuit integration technology replacing LSI appear as a result of advancements in semiconductor technology or other technologies derived from the technology, the functional blocks could be integrated using the future integrated circuit-technology. Another possibility is the application of biotechnology and/or the like.

The present disclosure can be realized by any kind of apparatus, device or system having a function of communication, which is referred to as a communication apparatus.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of Japanese Patent Application No. 2018-165250, filed on Sep. 4, 2018 including the specification, drawings and abstract, is incorporated herein by reference in its entirety.

INDUSTRIAL APPLICABILITY

This disclosure can be applied to a wireless apparatus to achieve practical implementation of FDMA transmission of WUR signals to WUR STAs operating in duty cycle mode.

REFERENCE SIGNS LIST 110, 1900, 2000 AP
120 STA
130, 140, 150, 160, 2100, 2200 WUR STA
112, 122, 132, 142, 152, 162, 1900, 2050, 2130, 2250 PCR
134, 144, 154, 164, 2110, 2260 WURx
1902, 2002, 2102, 2202 Antenna
1910, 2112, 2132, 2262 RF/Analog Front End
1920, 2060, 2140, 2254 PHY processing circuitry
1922, 2062, 2142, 2256 OFDM Modulator/Demodulator
2122, 2268 WUR channel tuner
2124, 2270 WUR channel scheduler
1932, 2056 WUR Frame Generator
1924, 2064 Channel Tuner
1930, 2052, 2144, 2252 MAC processing circuitry
2054 PCR Payload Generator 2010, 2210 Power Source
2020, 2220 Memory
2030, 2230 CPU
2040, 2240 Secondary Storage
2050 Wireless I/F
2070 Wired Communication I/F
2114, 2264 WUR Preamble Detection
2116, 2266 WUR Packet Decoding/Processing module

The invention claimed is:

1. A communication apparatus comprising:
a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
a processor which, in operation, operates the duty cycle, wherein:
during a determined time from the TWBTT, any WUR frame is not transmitted in the first channel from the AP, and
the determined time varies depending on whether the first channel and the second channel are on the same or different frequency bands.

2. The communication apparatus of claim 1 wherein:
a time period of the on duration is smaller than a duty cycle period of the duty cycle, and
the time period of the on duration does not overlap with the TWBTT.

3. The communication apparatus of claim 1 wherein:
the receiver, in operation, receives no WUR frame in the first channel during the determined time from the TWBTT.

4. The communication apparatus of claim 1 wherein:
the receiver, in operation, receives the WUR frame in the first channel during a time other than the determined time from the TWBTT.

5. The communication apparatus of claim 1 wherein:
the receiver, in operation, receives the WUR Beacon frame in the second channel during the determined time from the TWBTT.

6. The communication apparatus of claim 5 wherein:
the receiver, in operation, receives the WUR frame based on information of the WUR Beacon frame.

7. The communication apparatus of claim 1 wherein:
the communication apparatus is, in operation, under a negotiation status with the AP such that the communication apparatus alternates between an awake state and a doze state, and
the communication apparatus has a capability to receive a WUR physical layer protocol data unit (PPDU) at a power consumption of less than 1 milliwatt.

8. A communication apparatus, comprising:
a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
a processor which, in operation, operates the duty cycle, wherein:
during a determined time from the TWBTT, any WUR frame is not transmitted in the first channel from the AP,
a time period of the on duration equals to a duty cycle period of the duty cycle, and
the time period of the on duration overlaps with the TWBTT.

9. A communication apparatus, comprising:
a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
a processor which, in operation, operates the duty cycle, wherein:
during a determined time from the TWBTT, any WUR frame is not transmitted in the first channel from the AP, and
the duty cycle is adjusted to be equal to a WUR Beacon Period which is an interval between two consecutive TWBTTs.

10. A communication apparatus, comprising:
a receiver which, in operation, receives a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
a processor which, in operation, operates the duty cycle, wherein:
during a determined time from the TWBTT, any WUR frame is not transmitted in the first channel from the AP, and
the duty cycle is adjusted to be equal to an integer multiple of a WUR Beacon Period which is an interval between two consecutive TWBTTs.

11. A communication method performed by a communication apparatus, the communication method comprising:
receiving a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
operating the duty cycle, wherein:
during a determined time from the TWBTT, any WUR frame is not transmitted in the first channel from the AP, and
the determined time varies depending on whether the first channel and the second channel are on the same or different frequency bands.

12. The communication method of claim 11 wherein:
a time period of the on duration is smaller than a duty cycle period of the duty cycle, and
the time period of the on duration does not overlap with the TWBTT.

13. The communication method of claim 11 comprising:
receiving no WUR frame in the first channel during the determined time from the TWBTT.

14. The communication method of claim 11 comprising:
receiving the WUR frame in the first channel during a time other than the determined time from the TWBTT.

15. The communication method of claim 11 comprising:
receiving the WUR Beacon frame in the second channel during the determined time from the TWBTT.

16. The communication method of claim 15 comprising: receiving the WUR frame based on information of the WUR Beacon frame.

17. A communication method performed by a communication apparatus, the communication method comprising:
receiving a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
operating the duty cycle, wherein:
during a determined time from the TWBTT, any WUR frame is not transmitted in the first channel from the AP,
a time period of the on duration equals to a duty cycle period of the duty cycle, and
the time period of the on duration overlaps with the TWBTT.

18. A communication method performed by a communication apparatus, the communication method comprising:
receiving a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
operating the duty cycle, wherein:
during a determined time from the TWBTT, any WUR frame is not transmitted in the first channel from the AP, and
the duty cycle is adjusted to be equal to a WUR Beacon Period which is an interval between two consecutive TWBTTs.

19. A communication method performed by a communication apparatus, the communication method comprising:
receiving a wake-up radio (WUR) frame, during an on duration in a duty cycle, in a first channel assigned to the communication apparatus by an Access Point (AP), and receives a WUR Beacon frame in a second channel, a transmission of the WUR Beacon frame being scheduled at a target WUR beacon transmission time (TWBTT); and
operating the duty cycle, wherein:
during a determined time from the TWBTT, any WUR frame is not transmitted in the first channel from the AP, and
the duty cycle is adjusted to be equal to an integer multiple of a WUR Beacon Period which is an interval between two consecutive TWBTTs.

20. A communication apparatus comprising:
a receiver which, in operation, receives a wake-up radio (WUR) frame, during an on duration, in a first channel assigned to the communication apparatus by an Access Point (AP), and receives a WUR Beacon frame in a second channel, a transmission of the WUR Beacon frame being scheduled at a target WUR beacon transmission time (TWBTT); and
a processor which, in operation, controls a time period of the on duration,
wherein, during a determined time from the TWBTT, any WUR frame is not transmitted in the first channel from the AP,
the time period of the on duration equals to a duty cycle period, and
the time period of the on duration overlaps with the TWBTT.

* * * * *